US012689498B2

(12) United States Patent \
Igura et al.

(10) Patent No.: US 12,689,498 B2 \
(45) Date of Patent: Jul. 21, 2026

(54) SIGNAL PROCESSING APPARATUS, SIGNAL PROCESSING METHOD, AND NON-TRANSITORY STORAGE MEDIUM STORING SIGNAL PROCESSING PROGRAM

(71) Applicants: NEC CORPORATION, Tokyo (JP); CENTRAL JAPAN RAILWAY COMPANY, Nagoya (JP)

(72) Inventors: Hiroyuki Igura, Tokyo (JP); Yoshihiro Matsumura, Aichi (JP); Takeshi Nishiyama, Aichi (JP); Tomoyuki Tange, Aichi (JP)

(73) Assignees: NEC CORPORATION, Tokyo (JP); CENTRAL JAPAN RAILWAY COMPANY, Nagoya (JP)

( * ) Notice: Subject to any disclaimer, the term of this patent is extended or adjusted under 35 U.S.C. 154(b) by 21 days.

(21) Appl. No.: 18/612,352

(22) Filed: Mar. 21, 2024

(65) Prior Publication Data

US 2024/0333468 A1 Oct. 3, 2024

(30) Foreign Application Priority Data

Mar. 30, 2023 (JP) ................................. 2023-054445

(51) Int. Cl.
H04L 7/00 (2006.01)
H04L 1/00 (2006.01)
(52) U.S. Cl.
CPC .......... *H04L 7/0079* (2013.01); *H04L 1/0054* (2013.01)

(58) Field of Classification Search
CPC . H04L 7/0079; H04L 1/0054; H04L 27/2656; H04B 1/707; H04B 1/7073; H04B 1/709
See application file for complete search history.

(56) References Cited

U.S. PATENT DOCUMENTS 5,555,247 A * 9/1996 Matsuoka ............... H04L 7/042 \
    375/362 \
8,385,371 B2 * 2/2013 Matsumoto ......... H04L 27/2656 \
    375/362

FOREIGN PATENT DOCUMENTS

| JP | 10-51436 A | 2/1998 |
| JP | 2007-96567 A | 4/2007 |
| JP | 2007-159040 A | 6/2007 |
| JP | 2007-521677 A | 8/2007 |

(Continued)

*Primary Examiner* — Betsy Deppe \
(74) *Attorney, Agent, or Firm* — Sughrue Mion, PLLC

(57) ABSTRACT

A signal processing apparatus includes: an autocorrelation processing circuit configured to generate an autocorrelation symbol; a symbol replica generation circuit configured to generate a symbol replica; an individual likelihood value calculation circuit configured to calculate a plurality of individual likelihood values by using the generated autocorrelation symbol and the generated symbol replica; a path likelihood value calculation circuit configured to integrate, for each of the plurality of calculated individual likelihood values, the individual likelihood value of the target frame and an integrated value of an individual likelihood value of a frame preceding the target frame to obtain a plurality of path likelihood values; and a path likelihood value selection circuit configured to select the largest path likelihood value from among the calculated path likelihood values to output frame identification information that corresponds to the selected path likelihood value.

20 Claims, 21 Drawing Sheets

(56)         References Cited

FOREIGN PATENT DOCUMENTS

| | | | |
|---|---|---|---|
| JP | 2009-44703 | A | 2/2009 |
| JP | 2009-77197 | A | 4/2009 |
| JP | 2011-182406 | A | 9/2011 |
| WO | 2016/027728 | A1 | 2/2016 |

* cited by examiner

SIGNAL PROCESSING APPARATUS, SIGNAL PROCESSING METHOD, AND NON-TRANSITORY STORAGE MEDIUM STORING SIGNAL PROCESSING PROGRAM

INCORPORATION BY REFERENCE

This application is based upon and claims the benefit of priority from Japanese patent application No. 2023-054445, filed on Mar. 30, 2023, the disclosure of which is incorporated herein in its entirety by reference.

TECHNICAL FIELD

The present disclosure relates to a frame synchronization method in wireless communication, and in particular, to a frame synchronization method with a low synchronization error probability in high noise environments.

BACKGROUND ART

In digital wireless communication, one extremely important requirement in order to correctly process received radio signals is to generate correct synchronous signals from reception signals. Therefore, most digital wireless systems include dedicated synchronous signals in a radio format, and are designed to perform synchronization processing between a transmitter and a receiver using the synchronous signals.

In a wireless system including a physical layer interface having a structure in which frames of a certain length are repeatedly transmitted, like in communication standards for mobile phones, in particular, radio control between a transmitter and a receiver is performed using frame numbers indicating relative positions of the frame structure. In order to achieve this radio control, a method for performing frame synchronization in which frame numbers are embedded in synchronous signals or the like and the receiver side retrieves the information on the frame numbers so that the order of the frames in the transmitter and that in the receiver match each other has often been used.

However, it is possible that frame synchronization may not be correctly performed due to a poor communication environment which occurs due to the presence of obstructions, reflected waves, or a lot of noise, or other factors such as fading. In these cases, it may be difficult to perform wireless communication for a certain period of time until the frame synchronization is restored.

In order to solve the aforementioned problem, various methods for performing frame synchronization with a highest possible accuracy have been proposed. One example of these methods may include a method for improving the accuracy of the synchronization by modifying a configuration of a synchronous signal to be transmitted. For example, Japanese Unexamined Patent Application Publication No. 2007-96567 proposes a method in which communication data is constantly monitored on a transmission side, and when a free channel is detected, a frame number is inserted into this free channel, whereby the frame synchronization accuracy is enhanced.

Further, Japanese Unexamined Patent Application Publication No. 2007-159040 proposes a method for improving frequency pulling characteristics and increasing the speed of frame timing detection by using a specific code sequence in a pilot symbol pattern.

Further, International Patent Publication No. WO 2016/027728 proposes a method for improving frame synchronization performance by arranging, following a signal sequence for frame detection formed of a repetition of a known signal sequence, a signal sequence for frame synchronization formed of a known signal sequence or its inverted sequence.

Other methods may include a method for reducing an influence of out-of-synchronization by detecting an asynchronous state and increasing the speed of synchronization at the time of re-synchronization.

For example, Japanese Unexamined Patent Application Publication No. 2009-44703 proposes a method for promptly performing re-synchronization by comparing a magnitude relation between frame numbers of received frame synchronous signals to determine whether frame synchronization is normal.

Further, Japanese Unexamined Patent Application Publication No. H10-51436 proposes a method for implementing rapid frame synchronization by performing synchronization in which bit missing and bit duplicate of frame numbers used for frame synchronization are allowed.

Further, Japanese Unexamined Patent Application Publication No. 2011-182406 proposes a method for performing frame synchronization by performing an approximate match between known signals and reception signals.

Further, Published Japanese Translation of PCT International Publication for Patent Application, No. 2007-521677 proposes a method for performing comparison of a plurality of expected received sequences and determining that synchronization has occurred when the number of matches exceeds a predetermined threshold, and proposes a method for increasing the speed of synchronization processing using the above method.

Other proposed methods include a method for improving the accuracy of the synchronization by modifying an algorithm on a receiving side. For example, Japanese Unexamined Patent Application Publication No. 2009-77197 proposes a method for reducing synchronization errors by establishing self-synchronization using a phase difference between a free-running counter provided for each channel card and a transmission frame number sent from a sender.

While frame synchronization methods according to related art propose various methods for improving the accuracy of the synchronization, there is still a problem that frame synchronization performance in a poorer communication environment such as an environment where noise is much greater than that in a normal wireless communication environment is not sufficiently high.

For example, in wireless communication where a high frequency such as millimeter waves is used, there is a significant decrease in reception levels due to rainfall attenuation. Therefore, when a once-in-a-decade level of heavy rainfall occurs, relative noise included in reception signals becomes so great that frame synchronization may become difficult.

Methods for solving the aforementioned problem include a method for increasing a spreading rate or the number of iterations in a spectrum spread of frame synchronous signals that are present in one frame. This method has an effect of substantially increasing the total received power of synchronous signals and contributes to improving a frame synchronization accuracy.

However, when the spreading rate or the number of iterations of the synchronous signals is increased, the number of signals for sending normal data needs to be relatively reduced, which causes a problem that the data transmission rate is decreased. That is, according to the methods according to related art, there is a tradeoff between allowing a decrease in the data transmission rate and instead maintaining a frame synchronization accuracy in a poor communication environment which rarely occurs, and giving up trying to communicate in the poor communication environment which rarely occurs and instead maintaining a high data transmission rate.

In view of the aforementioned problem, one of the objects of the present disclosure is to provide a signal processing apparatus capable of generating highly accurate frame identification information that contributes to improving a frame synchronization accuracy, a signal processing method, and a signal processing program.

SUMMARY

A signal processing apparatus according to one illustrative example embodiment includes: an autocorrelation processing circuit configured to generate, by using one or more symbol values included in a synchronous signal of a target frame and one or more corresponding symbol values included in a synchronous signal of a frame immediately before the target frame, one or more autocorrelation symbols indicating a change component of frame identification information of the target frame as compared to frame identification information of the frame immediately before the target frame; a symbol replica generation circuit configured to generate, by using one or more symbol values that correspond to the frame identification information of the target frame and one or more symbol values that correspond to the frame identification information of the frame immediately before the target frame, one or more symbol replicas indicating a change component of the one or more symbol values included in the synchronous signal of the frame immediately before the target frame as compared to the one or more symbol values included in the synchronous signal of the target frame; an individual likelihood value calculation circuit configured to calculate, by using the one or more autocorrelation symbols generated by the autocorrelation processing circuit and the one or more symbol replicas generated by the symbol replica generation circuit, a plurality of individual likelihood values indicating respective likelihoods of a plurality of pieces of frame identification information that are candidates for the frame identification information of the target frame; a path likelihood value calculation circuit configured to integrate, for each of the plurality of individual likelihood values calculated by the individual likelihood value calculation circuit, an individual likelihood value of the target frame and an integrated value of individual likelihood values of one or more frames preceding the target frame to obtain a plurality of path likelihood values indicating respective likelihoods of the plurality of pieces of frame identification information that are candidates for the frame identification information of the target frame; and a path likelihood value selection circuit configured to select the largest path likelihood value from among the path likelihood values obtained by the path likelihood value calculation circuit and output frame identification information that corresponds to the selected path likelihood value.

In a signal processing method executed by a computer according to another illustrative example embodiment, the computer is configured to: generate, by using one or more symbol values included in a synchronous signal of a target frame and one or more corresponding symbol values included in a synchronous signal of a frame immediately before the target frame, one or more autocorrelation symbols indicating a change component of frame identification information of the target frame as compared to frame identification information of the frame immediately before the target frame; generate, by using one or more symbol values that correspond to the frame identification information of the target frame and one or more symbol values that correspond to the frame identification information of the frame immediately before the target frame, one or more symbol replicas indicating a change component of one or more symbol values included in the synchronous signal of the frame immediately before the target frame as compared to one or more symbol values included in the synchronous signal of the target frame; calculate, by using the one or more generated autocorrelation symbols and the one or more generated symbol replicas, a plurality of individual likelihood values indicating respective likelihoods of a plurality of pieces of frame identification information that are candidates for the frame identification information of the target frame; integrate, for each of the plurality of calculated individual likelihood values, an individual likelihood value of the target frame and an integrated value of individual likelihood values of one or more frames preceding the target frame to obtain a plurality of path likelihood values indicating respective likelihoods of the plurality of pieces of frame identification information that are candidates for the frame identification information of the target frame; and select the largest path likelihood value from among the path likelihood values that have been calculated and output frame identification information that corresponds to the selected path likelihood value.

In a non-transitory storage medium storing a signal processing program according to another illustrative example embodiment, a signal processing program causes a computer to: generate, by using one or more symbol values included in a synchronous signal of a target frame and one or more corresponding symbol values included in a synchronous signal of a frame immediately before the target frame, one or more autocorrelation symbols indicating a change component of frame identification information of the target frame as compared to frame identification information of the frame immediately before the target frame; generate, by using one or more symbol values that correspond to the frame identification information of the target frame and one or more symbol values that correspond to the frame identification information of the frame immediately before the target frame, one or more symbol replicas indicating a change component of one or more symbol values included in the synchronous signal of the frame immediately before the target frame as compared to one or more symbol values included in the synchronous signal of the target frame; calculate, by using the one or more generated autocorrelation symbols and the one or more generated symbol replicas, a plurality of individual likelihood values indicating respective likelihoods of a plurality of pieces of frame identification information that are candidates for the frame identification information of the target frame; integrate, for each of the plurality of calculated individual likelihood values, an individual likelihood value of the target frame and an integrated value of individual likelihood values of one or more frames preceding the target frame to cause the computer to obtain a plurality of path likelihood values indicating respective likelihoods of the plurality of pieces of frame identification information that are candidates for the frame identification information of the target frame; and select the largest path likelihood value from among the path likelihood values that have been calculated to cause the computer to output frame identification information that corresponds to the selected path likelihood value.

BRIEF DESCRIPTION OF DRAWINGS

The above and other aspects, features and advantages of the present disclosure will become more apparent from the following description of certain exemplary embodiments when taken in conjunction with the accompanying drawings, in which.

EXAMPLE EMBODIMENT

Figure 1:
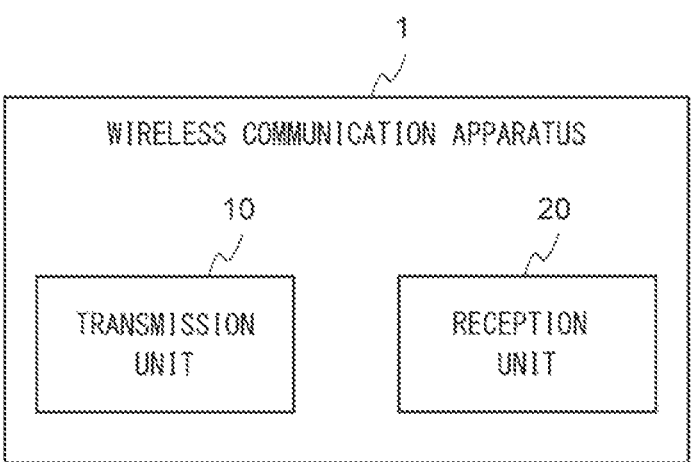
FIG. 1 is a block diagram showing a wireless communication apparatus according to one illustrative example embodiment.

With reference to the drawings, example embodiments for implementing the present disclosure will be described. FIG. 1 is a block diagram showing a wireless communication apparatus 1 according to one illustrative example embodiment. The wireless communication apparatus 1, which is an apparatus for performing wireless data communication, includes a transmission unit 10 and a reception unit 20. The transmission unit 10 is means for wirelessly transmitting data to be transmitted. The reception unit 20 is means for receiving the wirelessly-transmitted data.

Figure 2:
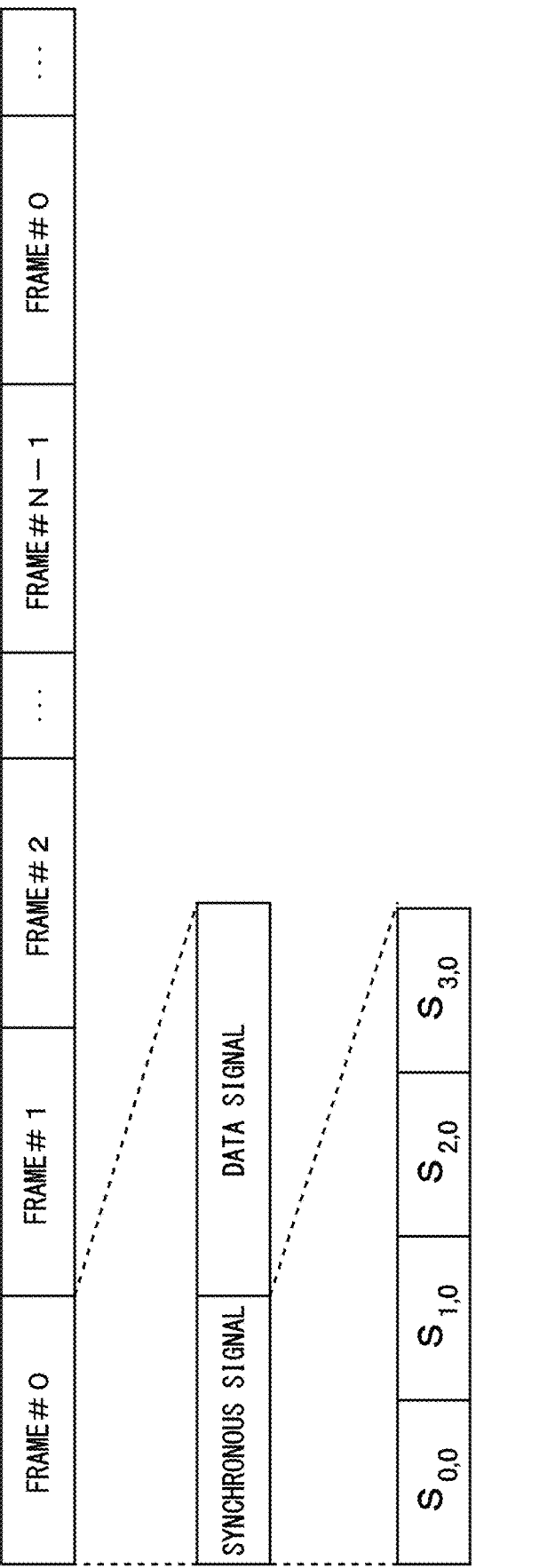
FIG. 2 is a diagram showing a configuration of radio frames according to one illustrative example embodiment.

FIG. 2 is a diagram showing a configuration of radio frames according to one illustrative example embodiment. When the wireless communication apparatus 1 transmits data having a radio frame configuration shown in FIG. 2, the wireless communication apparatus 1 continuously transmits a frame #0 to a frame #N−1, which are a plurality of frames having the same length. Each frame includes a synchronous signal and a data signal.

The synchronous signal is a signal used for timing synchronization and frame synchronization. The data signal is communication data other than the synchronous signal. The synchronous signal includes one or more symbol values S, which are signals obtained by modulating frame identification information of the frame to which this synchronous signal belongs. In this example embodiment, a frame number is adopted as one example of the frame identification information. For example, the synchronous signal of the frame identified by "#0" includes one or more symbol values $S_{0,0}$, $S_{1,0}$, $S_{2,0}$, and $S_{3,0}$ obtained by modulating the frame number "0" of this frame. For example, in a case of a numerical value of four bits, the frame number "0" becomes a binary number "0000" in which "0" is consecutive for four bits. As shown in FIG. 2, the frame number of each of the following frames is larger than the preceding frame by one, like 0, 1, 2, . . . , N−1, and the frame number next to the maximum frame number "N−1" returns to 0. Note that N is a positive integer.

Figure 3:
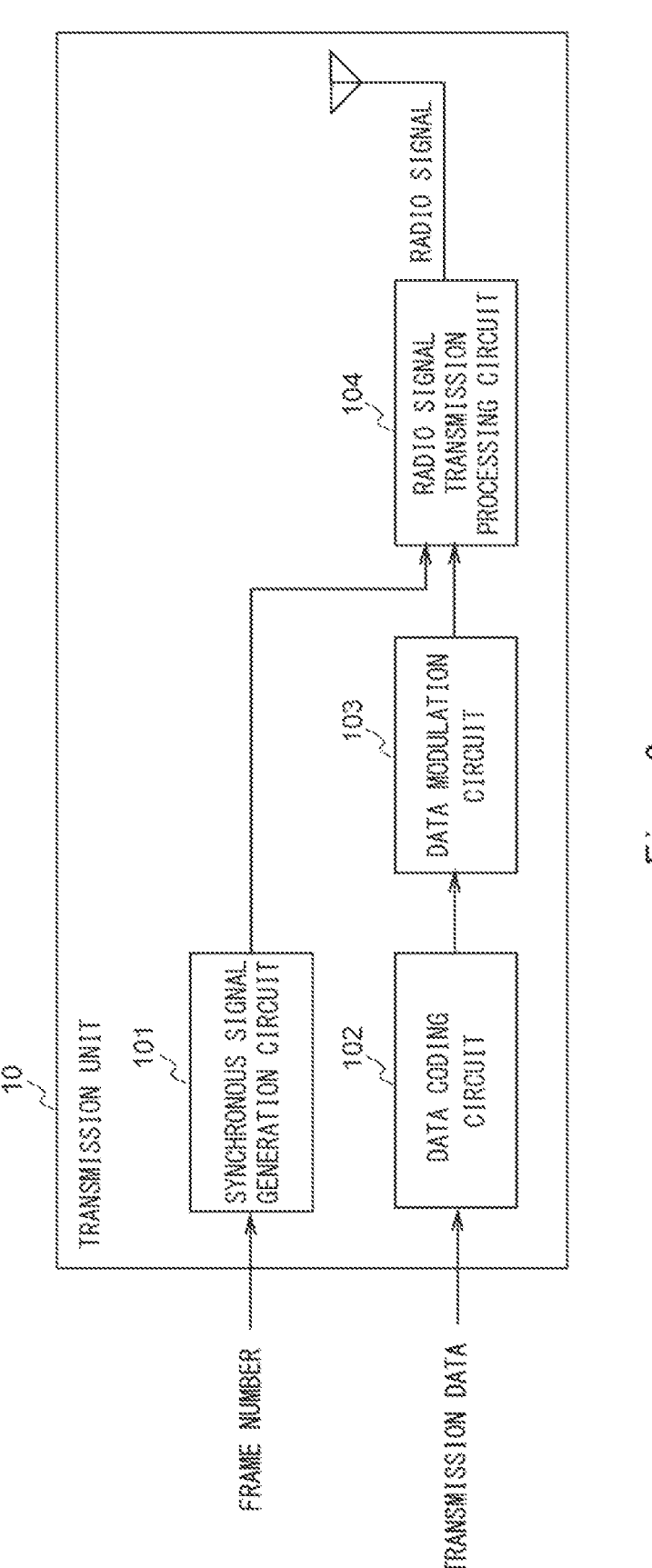
FIG. 3 is a block diagram showing a configuration of a transmission unit according to one illustrative example embodiment.

FIG. 3 is a block diagram showing a configuration of the transmission unit 10 according to one illustrative example embodiment. While the flow of data is indicated by one-way arrows in the figures described herein to facilitate understanding of the present disclosure, it should be noted that the data communication between functional means is not limited to one direction and bidirectional data communication is possible.

The transmission unit 10 includes a synchronous signal generation circuit 101, a data coding circuit 102, a data modulation circuit 103, and a radio signal transmission processing circuit 104.

The synchronous signal generation circuit 101 modulates an input frame number and generates a synchronous signal including the modulated frame number. The data coding circuit 102 codes input data to be transmitted (hereinafter this data will be referred to as "transmission data"). The data modulation circuit 103 modulates the transmission data coded by the data coding circuit 102. The radio signal transmission processing circuit 104 synthesizes the synchronous signal generated by the synchronous signal generation circuit 101 and the transmission data coded by the data modulation circuit 103, converts the synthesized data into a radio signal, and outputs the radio signal after being converted.

Figure 4:
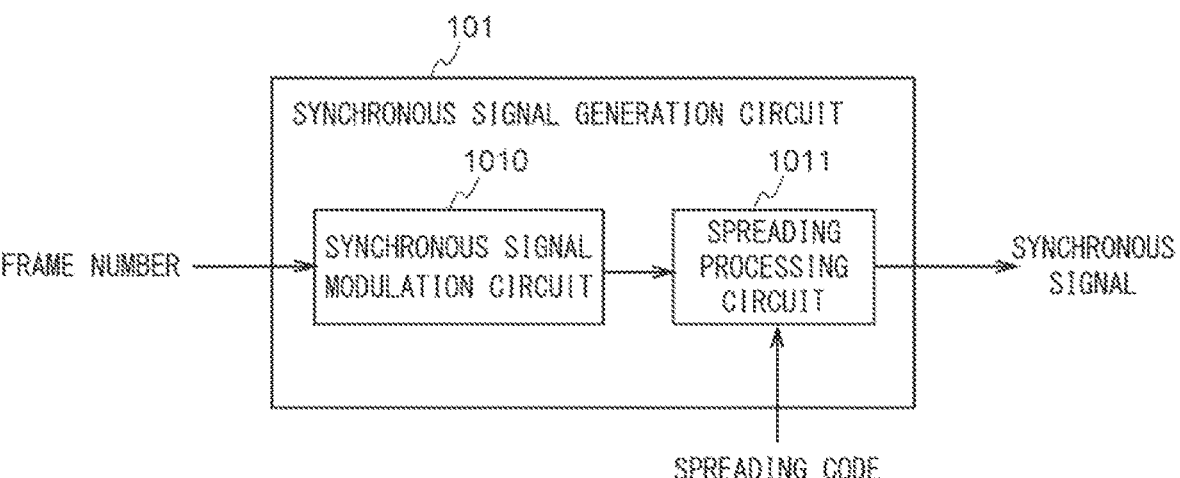
FIG. 4 is a block diagram showing details of a configuration of a synchronous signal generation circuit according to one illustrative example embodiment.

FIG. 4 is a block diagram showing details of the configuration of the synchronous signal generation circuit 101 according to one illustrative example embodiment. The synchronous signal generation circuit 101 includes a synchronous signal modulation circuit 1010 and a spreading processing circuit 1011.

The synchronous signal modulation circuit 1010 modulates the input frame number. The synchronous signal modulation circuit 1010 may employ, for example, a modulation system such as BPSK, QPSK, or 16QAM. The synchronous signal modulation circuit 1010 converts bit data into a complex baseband signal.

The spreading processing circuit 1011 performs spreading processing on the frame number modulated by the synchronous signal modulation circuit 1010 by using a spreading code to generate a synchronous signal. The spreading processing circuit 1011 may use a predetermined spreading code in a fixed manner. The predetermined spreading code can be selected from among candidates of desired spreading codes.

Figure 5:
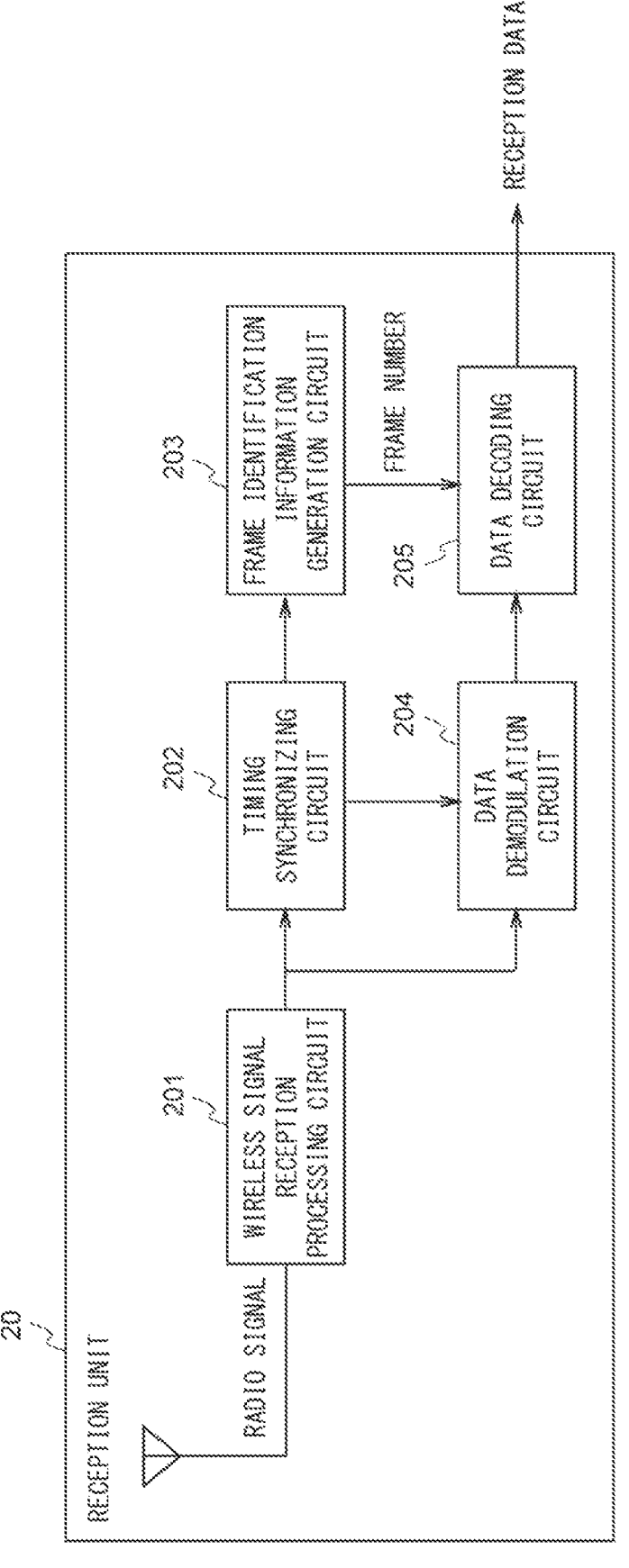
FIG. 5 is a block diagram showing a configuration of a reception unit according to one illustrative example embodiment.

FIG. 5 is a block diagram showing a configuration of the reception unit 20 according to one illustrative example embodiment. The reception unit 20 includes a wireless signal reception processing circuit 201, a timing synchronizing circuit 202, a frame identification information generation circuit 203, a data demodulation circuit 204, and a data decoding circuit 205. The functions included therein may be implemented by a semiconductor device such as a Field-Programmable Gate Array (FPGA) or an Application Specific Integrated Circuit (ASIC). Note that the functions included in these circuits may be implemented by a processor such as a Central Processing Unit (CPU) or a Micro Processing Unit (MPU). These devices correspond to a computer.

The wireless signal reception processing circuit 201 converts the received radio signal into a baseband signal.

The timing synchronizing circuit 202 generates a synchronous signal using the baseband signal output from the wireless signal reception processing circuit 201. The synchronous signal is used to generate a frame number and demodulate the baseband signal.

The frame identification information generation circuit 203 generates a frame number using the synchronous signal generated by the timing synchronizing circuit 202. The details of the frame identification information generation circuit 203 will be described later. The frame identification information generation circuit 203 corresponds to a signal processing apparatus.

The data demodulation circuit 204 demodulates the baseband signal converted by the wireless signal reception processing circuit 201 using the synchronous signal generated by the timing synchronizing circuit 202. In a case of, for example, a radio device of an Orthogonal Frequency Division Multiplexing (OFDM) system, the data demodulation circuit 204 cuts out the baseband signal in blocks for each OFDM symbol by using a timing pulse signal indicating a frame boundary extracted from the synchronous signal, and performs Fourier transformation on the unit of the block. Next, the data demodulation circuit 204 performs channel estimation on the Fourier-transformed baseband signal by using a reference signal embedded in the baseband signal. Then, the data demodulation circuit 204 performs equalization processing on data signals other than the reference signal by using results of the estimation, thereby demodulating the baseband signal.

The data decoding circuit 205 decodes data demodulated by the data demodulation circuit 204 by using the frame number generated by the frame identification information generation circuit 203. The data decoded by the data decoding circuit 205 corresponds to reception data. When, for example, a user 0 is allocated to even frame numbers and a user 1 is allocated to odd frame numbers, the data decoding circuit 205 is able to couple data sent in even frame numbers to generate decoded data for the user 0.

Figure 6:
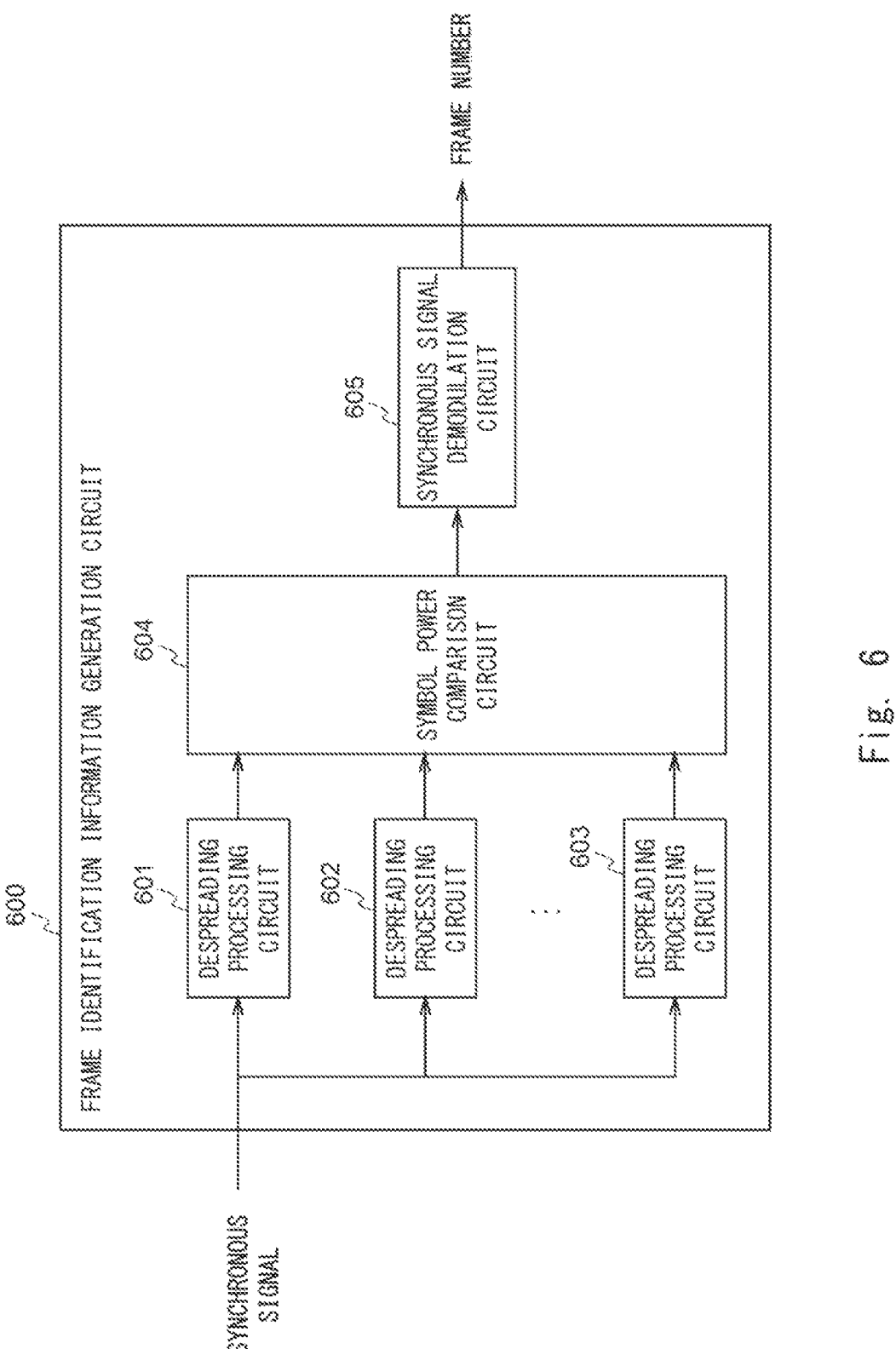
FIG. 6 is a block diagram showing a configuration of a frame identification information generation circuit according to related art.

FIG. 6 is a block diagram showing a configuration of a frame identification information generation circuit 600 according to related art. The frame identification information generation circuit 600 includes despreading processing circuits 601-603, a symbol power comparison circuit 604, and a synchronous signal demodulation circuit 605.

The despreading processing circuits 601-603 execute despreading processing on the input synchronous signal by using spreading codes to generate symbols. Desired spreading codes are respectively allocated to the despreading processing circuits 601-603. The spreading code allocated to one of the despreading processing circuits 601-603 is the same as that used by the synchronous signal generation circuit 101 of the transmission unit 10. In this case, the power of the symbol generated by one of the despreading processing circuits 601-603 using this spreading code becomes the largest.

The symbol power comparison circuit 604 selects, from among the symbols generated by the despreading processing circuits 601-603, the symbol with the greatest power. Accordingly, the symbol generated by despreading processing using the spreading code used to generate the synchronous signal is selected. The synchronous signal demodulation circuit 605 demodulates the symbol selected by the symbol power comparison circuit 604 to obtain one frame number.

As described above, the frame identification information generation circuit 600 according to related art shown in FIG. 6 selects the symbol generated based on the synchronous signal of one frame, demodulates this symbol, and thus generates a frame number. Therefore, the frame identification information generation circuit 600 according to related art shown in FIG. 6 uses a synchronous signal of only one frame in order to generate one frame number.

Figure 7:
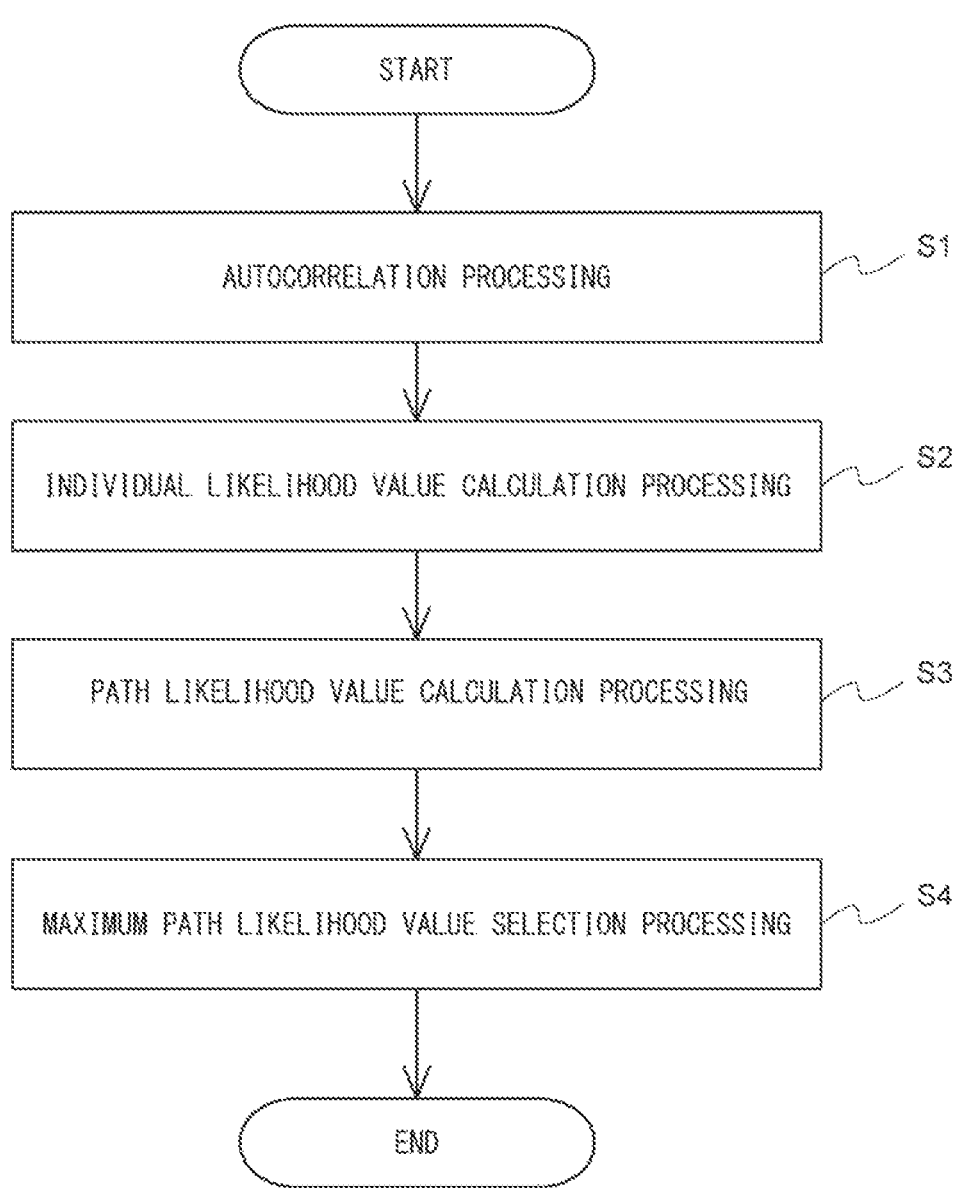
FIG. 7 is a flowchart showing processing executed by a frame identification information generation circuit according to one illustrative example embodiment.

FIG. 7 is a flowchart showing processing executed by the frame identification information generation circuit according to one illustrative example embodiment. The processing shown in FIG. 7 includes an autocorrelation processing S1 of a synchronous signal, an individual likelihood value calculation processing S2, a path likelihood value calculation processing S3, and a maximum path likelihood value selection processing S4. By executing these four processing, frame identification information is generated.

Figure 8:
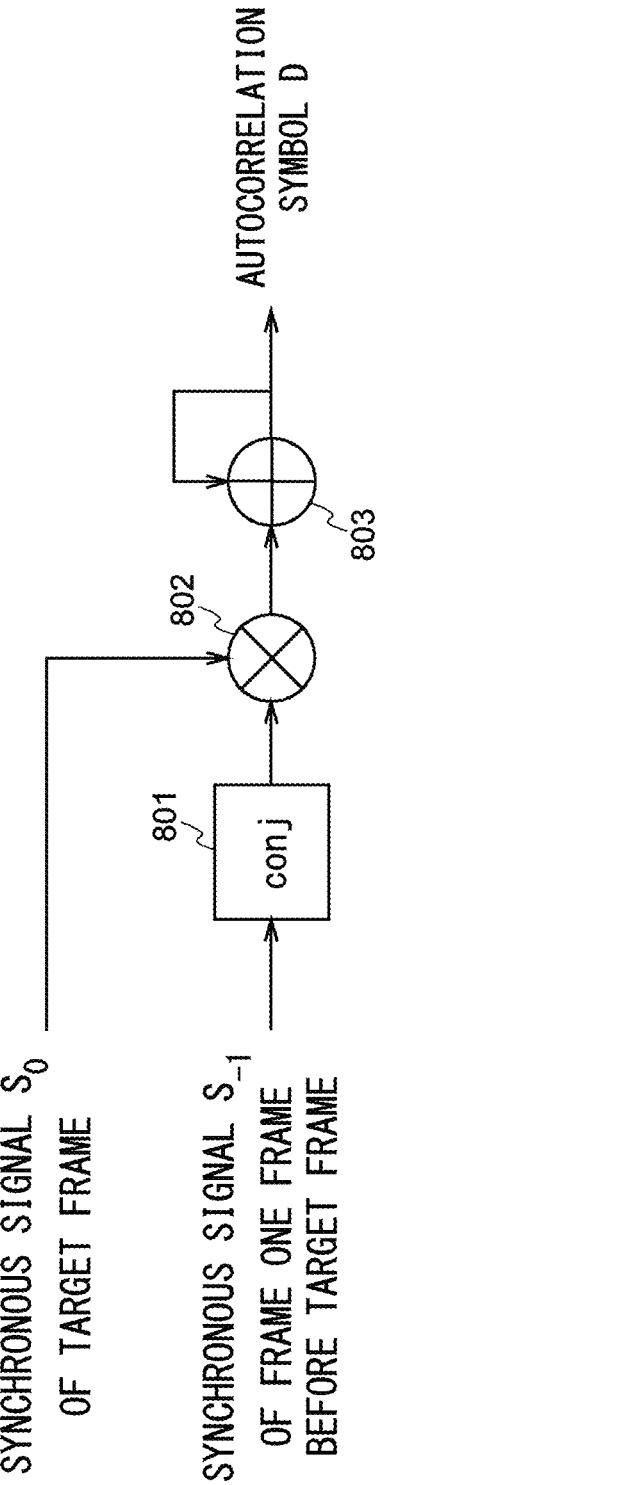
FIG. 8 is a diagram showing an outline of autocorrelation processing according to one illustrative example embodiment.

FIG. 8 shows an outline of the autocorrelation processing S1 of the synchronous signal. The synchronous signal on which the autocorrelation processing S1 is to be performed is formed of a plurality of complex sequences. The length of one complex sequence corresponds to a spreading rate in spreading processing.

First, a conjugate complex number conversion circuit (conj) 801 calculates a conjugate complex number of a synchronous signal $S_{-1}$, which is one frame before a synchronous signal $S_0$ of a target frame. Next, a complex multiplier 802 multiplies the synchronous signal $S_0$ of the target frame by the conjugate complex number of the synchronous signal $S_{-1}$ to obtain a multiplied value. Then, a complex adder 803 adds multiplied values for the spreading factor, whereby an autocorrelation symbol D is obtained. The spreading factor means, for example, when the spreading rate in the spectrum spread of the synchronous signal is 256, that 256 multiplied values are added.

The synchronous signal used in the autocorrelation processing S1 is a value obtained by multiplying a frame number, which is different for each frame, by a spreading code that is common among the frames. The spreading code is a spreading code in spectrum spread. Therefore, by executing the autocorrelation processing S1 for the synchronous signal, the spreading code component of the synchronous signal is canceled by the complex multiplier 802, and only a change component between the target frame number and the frame number immediately before the target frame number is obtained. This corresponds to the autocorrelation symbol D. In other words, the autocorrelation symbol D indicates a change component of the frame identification information of the target frame as compared to the frame identification information of the frame immediately before the target frame. This change component means the change in the symbol value of the frame number of the target frame as compared to the symbol value of the frame number of the frame immediately before the target frame.

Figure 9:
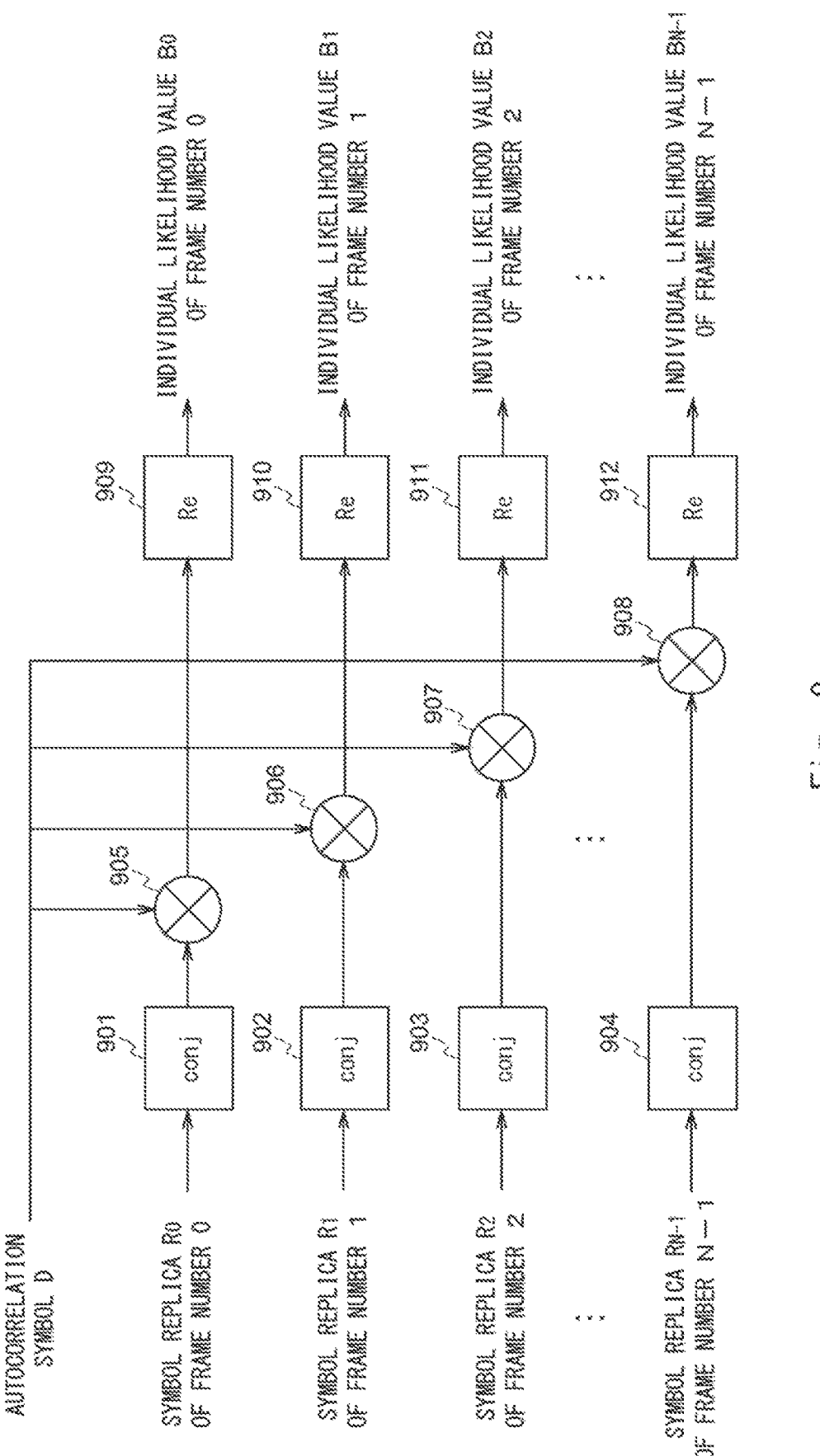
FIG. 9 is a diagram showing an outline of individual likelihood value calculation processing according to one illustrative example embodiment.

FIG. 9 shows an outline of the individual likelihood value calculation processing S2. It is assumed here that a symbol replica $R_i$ of a frame identified by a frame number i indicates a change component of one or more symbol values included in the synchronous signal of the frame identified by the frame number i as compared to one or more symbol values included in the synchronous signal of the frame identified by a frame number i−1. In other words, the symbol replica indicates a change component of one or more symbol values included in the synchronous signal of the target frame as compared to one or more symbol values included in the synchronous signal of the frame immediately before the target frame.

First, conjugate complex number conversion circuits (conj) 901-904 each calculate a conjugate complex number of the symbol replica $R_i$. Next, complex multipliers 905-908 each multiply the conjugate complex number of the symbol replica $R_i$ by the autocorrelation symbol D generated in the autocorrelation processing S1 to obtain a multiplied value. Then, actual value acquisition circuits (Re) 909-912 each calculate a real number component of the multiplied value calculated by the complex multipliers 905-908, respectively. The calculated real component corresponds to an individual likelihood value $B_i$ of the frame number i. The individual likelihood value $B_i$ indicates a likelihood that the synchronous signal used to calculate the autocorrelation symbol D used for the calculation of the individual likelihood value $B_i$ is the synchronous signal of the frame identified by the frame number i. For example, $B_0$ indicates the likelihood that the received synchronous signal used to calculate the autocorrelation symbol D used for the calculation of the individual likelihood value $B_0$ is the synchronous signal of the frame identified by the frame number 0. In other words, the individual likelihood value $B_i$ indicates the likelihood that the frame number component included in the synchronous signal used to calculate the autocorrelation symbol D related to the individual likelihood value $B_i$ is the frame number i.

By performing the individual likelihood value calculation processing S2 on the symbol replicas $R_0$ to $R_{N-1}$ of all the candidate frame numbers (0 to N−1) as described above, individual likelihood values $B_0$-$B_{N-1}$ of all the candidate frame numbers can be calculated.

Figure 10:
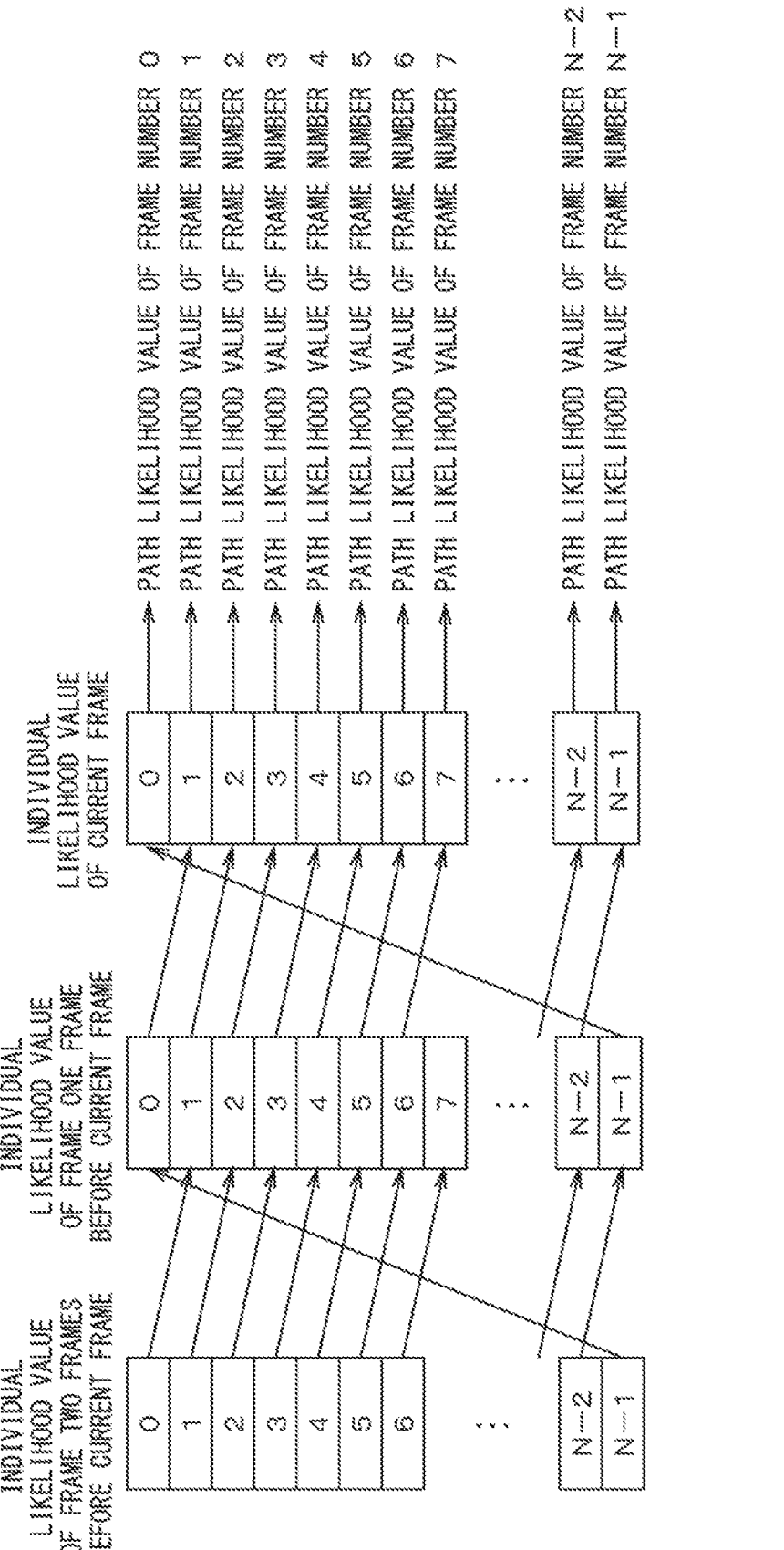
FIG. 10 is a diagram showing an outline of path likelihood value calculation processing according to one illustrative example embodiment.

FIG. 10 shows an outline of the path likelihood value calculation processing S3. In the path likelihood value calculation processing S3, path likelihood values are calculated using individual likelihood values of a plurality of frames received in a predetermined period. The path likelihood value is a value obtained by multiplying the individual likelihood values of the plurality of frames received in a predetermined period. Specifically, the path likelihood value of the frame number i of the current frame is a multiplied value obtained by multiplying the individual likelihood value of the frame number i of the current frame by the individual likelihood values of the plurality of preceding frames that correspond to the above individual likelihood value.

For example, as shown in FIG. 10, individual likelihood values of two preceding frames that correspond to the individual likelihood value identified by the frame number i of the current frame are the individual likelihood value identified by a frame number i−1, which is smaller than the frame number i by one frame, among the individual likelihood values of the frame immediately before the current frame, and the individual likelihood value identified by a frame number i−2, which is smaller than the frame number i by two frames, among the individual likelihood values of the frame two frames before the current frame. In this case, the path likelihood value of the frame number i of the current frame is a multiplied value obtained by multiplying the individual likelihood value of the frame number i of the current frame, the individual likelihood value identified by the frame number i−1, which corresponds to the frame one frame before the current frame, and the individual likelihood value identified by the frame number i−2, which corresponds to the frame two frames before the current frame. Note that the frame number which is smaller than the frame number 0 by one is N−1.

The path likelihood value of the frame number i thus obtained may indicate a relative likelihood of the frame number i at the present time in which the likelihood of the synchronous signal in frames for a past predetermined period is reflected. It is assumed, for example, that the frame number has been changed in order from 0→1→2→3. In this case, a value obtained by multiplying the likelihood that the frame number of the synchronous signal which is three frames before the latest synchronous signal is 0, the likelihood that the frame number of the synchronous signal two frames before the current frame is 1, the likelihood that the frame number of the synchronous signal one frame before the current frame is 2, and the likelihood that the frame number of the latest synchronous signal is 3 corresponds to the likelihood that the frame number at the present time is 3. This likelihood is a relative value with the likelihood that the frame number is another frame number.

In the maximum path likelihood value selection processing S4, all the path likelihood values calculated in the path likelihood value calculation processing S3 are compared, and the frame number of the largest path likelihood value is selected. The selected frame number of the path likelihood value corresponds to the most probable frame number. By using the aforementioned method, frame numbers can be calculated by using synchronous signals for L frames. The L frames means frames for the past predetermined period. It is therefore possible to calculate a frame number with a higher accuracy than that in a method for calculating a frame number using one synchronous signal. In other words, even when the line quality is dramatically degraded, such as in a poor communication environment, a frame synchronization accuracy that is sufficiently high for enabling wireless communication can be achieved.

Figure 11:
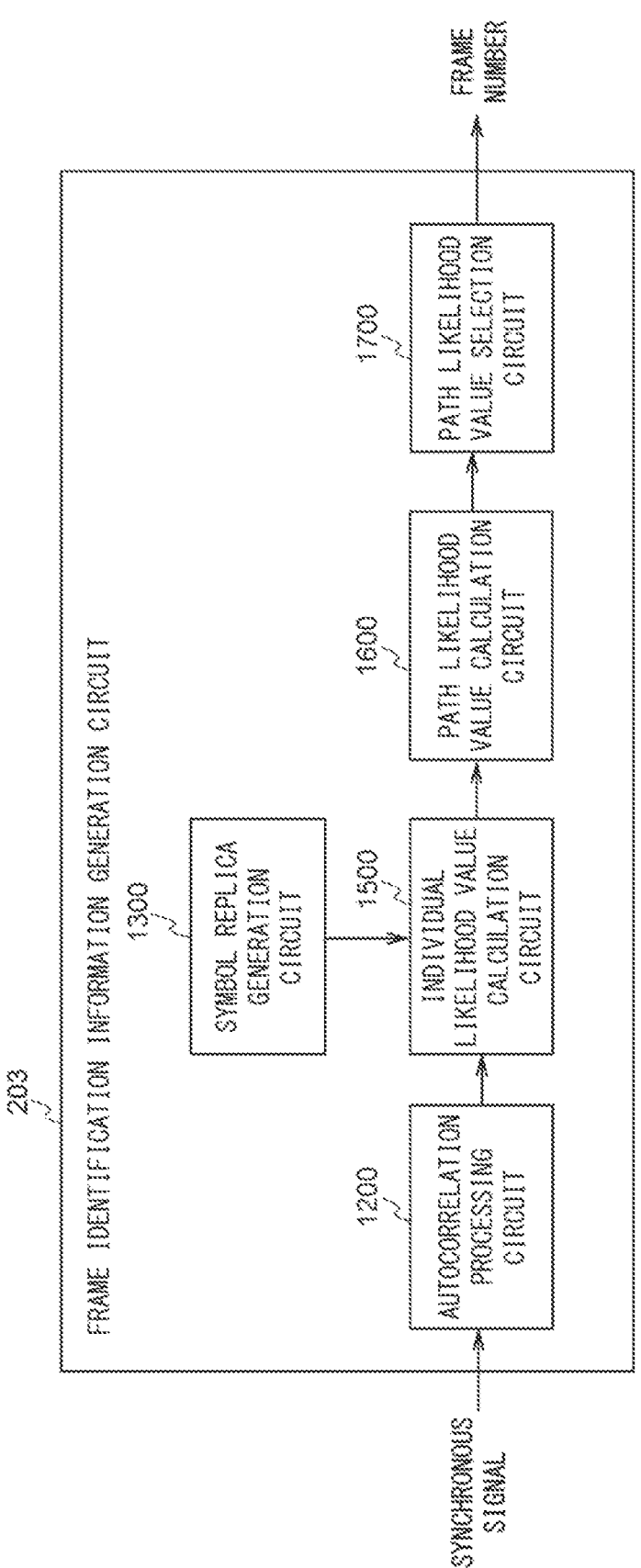
FIG. 11 is a block diagram showing one example of a configuration of a frame identification information generation circuit according to one illustrative example embodiment.

FIG. 11 is a block diagram showing one example of a configuration of the frame identification information generation circuit 203 according to one illustrative example embodiment. The frame identification information generation circuit 203 includes an autocorrelation processing circuit 1200, a symbol replica generation circuit 1300, an individual likelihood value calculation circuit 1500, a path likelihood value calculation circuit 1600, and a path likelihood value selection circuit 1700.

The autocorrelation processing circuit 1200 generates an autocorrelation symbol D using the input synchronous signal. The symbol replica generation circuit 1300 generates a symbol replica signal.

The individual likelihood value calculation circuit 1500 calculates individual likelihood values using the autocorrelation symbol D generated by the autocorrelation processing circuit 1200 and the symbol replica signal generated by the symbol replica generation circuit 1300. The individual likelihood values indicate respective likelihoods of the plurality of pieces of frame identification information that are candidates for the frame identification information of the target frame.

The path likelihood value calculation circuit 1600 integrates one or more individual likelihood values calculated by the individual likelihood value calculation circuit 1500 to obtain the path likelihood values. The path likelihood values indicate the respective likelihoods of the plurality of pieces of frame identification information that are candidates for the frame identification information of the target frame. The path likelihood values are calculated by integrating the target individual likelihood values in accordance with a predetermined constraint condition defined with regard to the change in frame numbers. The constraint condition is a condition that the frame number is continuous and cyclic. One example of the constraint condition is as follows. For example, when the frame numbers from "O" to "N−1" are allocated to a plurality of continuous frames and each of these frame numbers is incremented by one, the number of the frame next to the frame identified by the frame number "O" is "1", the number of the frame next to the frame identified by the frame number "1" is "2", and the number of the frame next to the frame identified by the frame number "N−1" returns to "0".

The path likelihood value selection circuit 1700 selects, by using the plurality of path likelihood values calculated by the path likelihood value calculation circuit 1600, a frame number that corresponds to the maximum path likelihood value, in other words, the most probable frame number.

Figure 12:
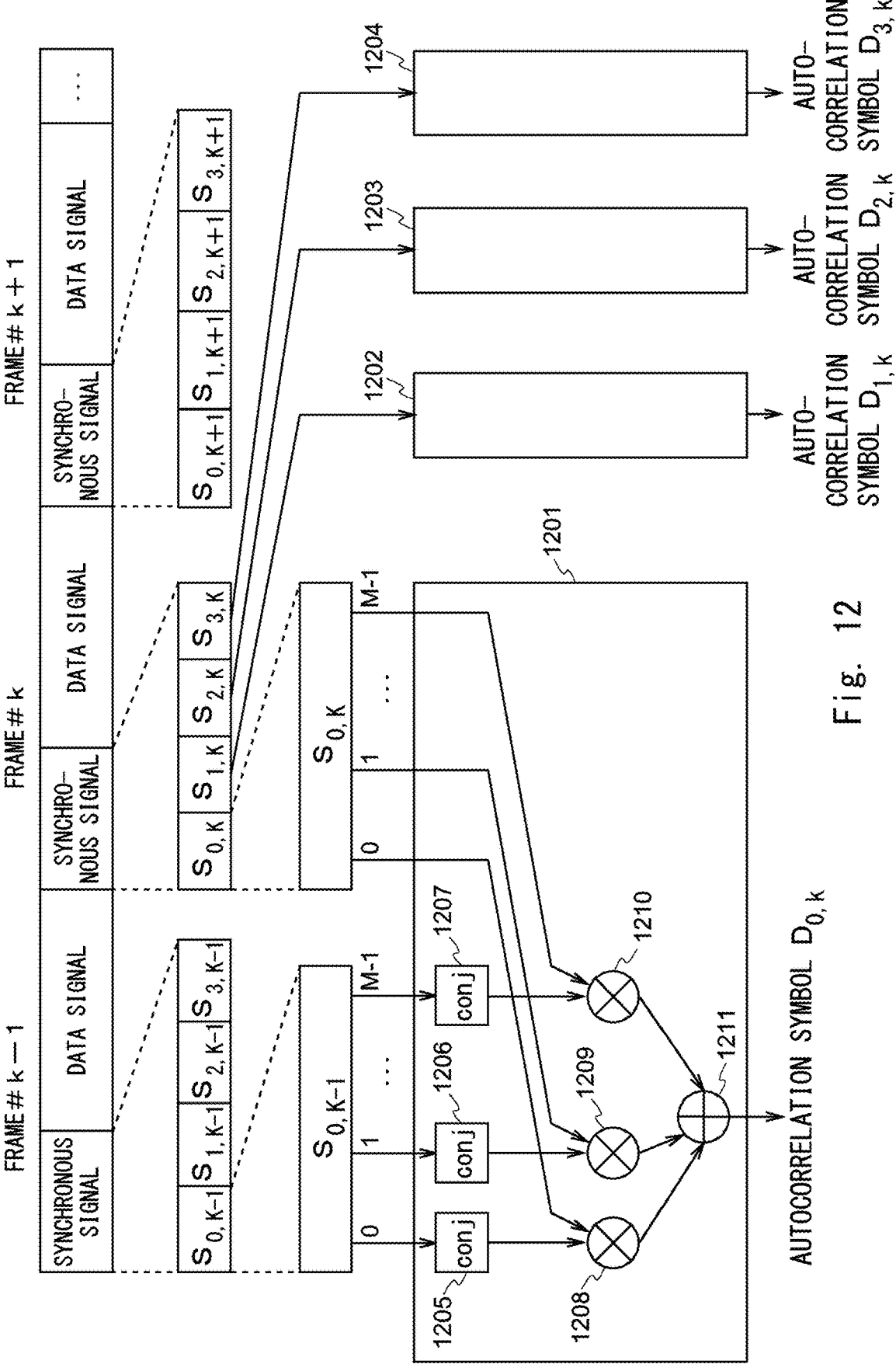
FIG. 12 is a diagram showing one example of an autocorrelation processing circuit.

FIG. 12 is a diagram showing autocorrelation processing circuits 1201-1204, which are examples of the autocorrelation processing circuit 1200. The autocorrelation processing circuit 1200 generates, by using one or more symbol values of the synchronous signal of the target frame and the corresponding one or more symbol values of the synchronous signal of a frame immediately before the target frame, an autocorrelation symbol D indicating a change in the frame number of the target frame as compared to the frame number of the frame immediately before the target frame. It is assumed, in the example shown in FIG. 12, that the synchronous signal of the frame k is formed of four symbols of $S_{0,k}$, $S_{1,k}$, $S_{2,k}$, and $S_{3,k}$. Note that k is an integer equal to or larger than two. Each symbol of the synchronous signal is formed of a complex sequence for M spreading codes. The symbol M is any natural number. The autocorrelation processing circuits 1201, 1202, 1203, and 1204 each process synchronous signals $S_{0,k}$, $S_{1,k}$, $S_{2,k}$, and $S_{3,k}$.

The autocorrelation processing circuit 1201 calculates an autocorrelation symbol $D_{0,k}$ using the symbol of the synchronous signal $S_{0,k}$ of the target frame and the corresponding symbol of the synchronous signal $S_{0,k}$ of the frame immediately before the above frame.

When, for example, the autocorrelation symbol $D_{0,k}$ of the frame k is calculated as shown in FIG. 12, first, conjugate complex number conversion circuits 1205-1207 calculate respective conjugate complex numbers of a synchronous signal symbol $S_{0,k-1}$ of the frame k−1, which is a frame immediately before the frame k. Accordingly, conjugate complex numbers for M spreading codes are calculated. Next, complex multipliers 1208-1210 calculate the inner product of each synchronous signal symbol $S_{0,k}$ of the frame k and the conjugate complex number of the corresponding synchronous signal symbol $S_{0,k-1}$ of the frame k−1 to calculate M respective complex sequences. Then, a complex adder 1211 adds M complex sequences calculated by the complex multipliers 1208-1210 to obtain the autocorrelation symbol $D_{0,k}$.

The autocorrelation processing circuits 1202, 1203, and 1204 respectively calculate autocorrelation symbols $D_{1,k}$, $D_{2,k}$, and $D_{3,k}$ by using the synchronous signals $S_{1,k}$, $S_{2,k}$, and $S_{3,k}$ and the corresponding synchronous signals $S_{1,k-1}$, $S_{2,k-1}$, and $S_{3,k-1}$, similar to the autocorrelation processing circuit 1201.

Therefore, the autocorrelation processing circuits 1201-1204 each include a conjugate complex number conversion circuit, a complex multiplier, and a complex adder. The conjugate complex number conversion circuit calculates a plurality of conjugate complex numbers of symbol values included in the synchronous signal of the frame immediately before the target frame that corresponds to the plurality of symbol values included in the synchronous signal of the target frame. The complex multiplier calculates the inner product of the plurality of symbol values included in the synchronous signal of the target frame and the plurality of conjugate complex numbers calculated by the conjugate complex number conversion circuit to calculate a plurality of complex sequences. The complex adder adds up the plurality of complex sequences calculated by the complex multiplier to generate an autocorrelation symbol.

Figure 13:
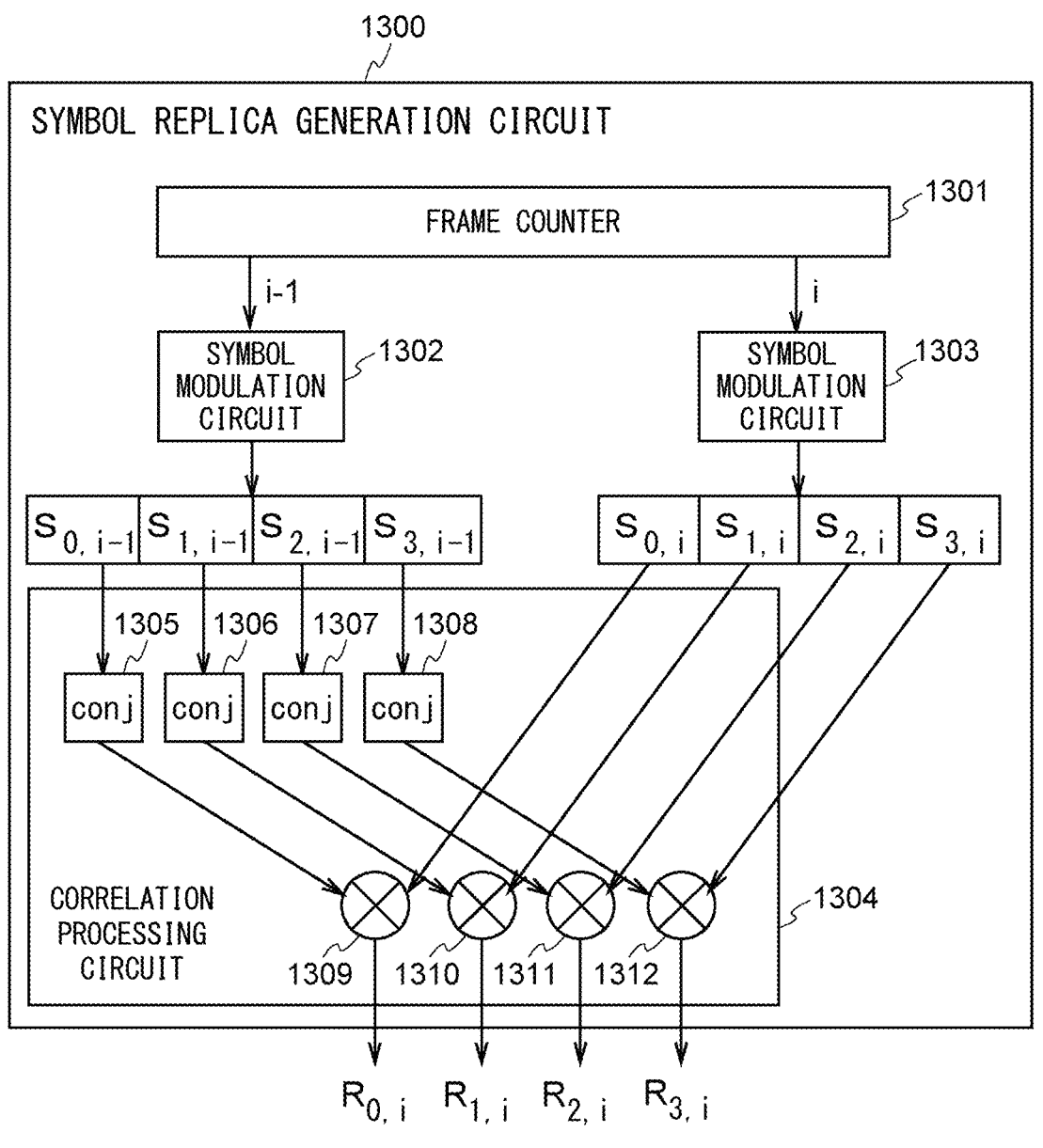
FIG. 13 is a block diagram showing one example of a symbol replica generation circuit.

FIG. 13 shows one example of the symbol replica generation circuit 1300. The symbol replica generation circuit 1300 includes a frame counter 1301, two symbol modulation circuits 1302 and 1303, and a correlation processing circuit 1304.

The frame counter 1301 generates a counter value i and a counter value i−1 that correspond to frame numbers. In other words, the frame counter 1301 generates the frame number of the target frame and the frame number of the frame immediately before the target frame. The counter value i−1 and the counter value i are respectively input to the symbol modulation circuit 1302 and the symbol modulation circuit 1303.

The symbol modulation circuit 1302 generates modulated symbols $S_{0,i-1}$, $S_{1,i-1}$, $S_{2,i-1}$, and $S_{3,i-1}$ using the counter value i−1. The symbol modulation circuit 1303 generates modulated symbols $S_{0,i}$, $S_{1,i}$, $S_{2,i}$, and $S_{3,i}$ using the counter value i. Specifically, the symbol modulation circuits 1302 and 1303 respectively modulate the frame number of the frame immediately before the target frame and the frame number of the target frame generated by the frame counter 1301, thereby generating the modulated symbols $S_{0,i-1}$, $S_{1,i-1}$, $S_{2,i-1}$, and $S_{3,i-1}$ and the modulated symbols $S_{0,i}$, $S_{1,i}$, $S_{2,i}$, and $S_{3,i}$, respectively. The symbol modulation circuits 1302 and 1303 may adopt, for example, a modulation system such as BPSK, QPSK, or 16QAM. The symbol modulation circuits 1302 and 1303 convert bit data into complex baseband signals.

The correlation processing circuit 1304 includes conjugate complex number conversion circuits 1305-1308 and complex multipliers 1309-1312. The conjugate complex number conversion circuits 1305-1308 calculate conjugate complex numbers of the symbol values $S_{0,i-1}$, $S_{1,i-1}$, $S_{2,i-1}$, and $S_{3,i-1}$ generated based on the counter value i−1. In other words, the conjugate complex number conversion circuits 1305-1308 calculate conjugate complex numbers of the symbol values $S_{0,i-1}$, $S_{1,i-1}$, $S_{2,i-1}$, and $S_{3,i-1}$ generated based on the frame number of the frame immediately before the target frame.

The complex multipliers 1309-1312 respectively multiply the conjugate complex numbers of the symbol values $S_{0,i-1}$, $S_{1,i-1}$, $S_{2,i-1}$, and $S_{3,i-1}$ generated based on the counter value i−1 by the symbol values $S_{0,i}$, $S_{1,i}$, $S_{2,i}$, and $S_{3,i}$ generated based on the counter value i to generate symbol replicas $R_{0,i}$, $R_{1,i}$, $R_{2,i}$, and $R_{3,i}$. In other words, the complex multipliers 1309-1312 respectively multiply the conjugate complex numbers of the symbol values $S_{0,i-1}$, $S_{1,i-1}$, $S_{2,i-1}$, and $S_{3,i-1}$ generated based on the frame number of the frame immediately before the target frame by the symbol values $S_{0,i}$, $S_{1,i}$, $S_{2,i}$, and $S_{3,i}$ generated based on the frame number of the target frame to generate symbol replicas $R_{0,i}$, $R_{1,i}$, $R_{2,i}$, and $R_{3,i}$.

As described above, the symbol replica generation circuit 1300 includes a first symbol modulation circuit 1302, a second symbol modulation circuit 1303, one or more conjugate complex number conversion circuits 1305-1308, and one or more complex multipliers 1309-1312. The first symbol modulation circuit 1302 modulates the frame number of the frame immediately before the target frame and generates one or more modulated symbol values of the frame immediately before the target frame. The second symbol modulation circuit 1303 modulates the frame number of the target frame to generate one or more modulated symbol values of the target frame. The one or more conjugate complex number conversion circuits 1305-1308 calculate the conjugate complex numbers of the modulated symbol values of the frame immediately before the target frame generated by the first symbol modulation circuit. The one or more complex multipliers 1309-1312 multiply the modulated symbol values of the target frame generated by the second symbol modulation circuit by the conjugate complex numbers of the modulated symbol values of the frame immediately before the target frame that correspond to the modulated symbol values of the target frame, the conjugate complex numbers of the modulated symbol values being generated by the conjugate complex number conversion circuit, to generate symbol replicas.

Figure 14:
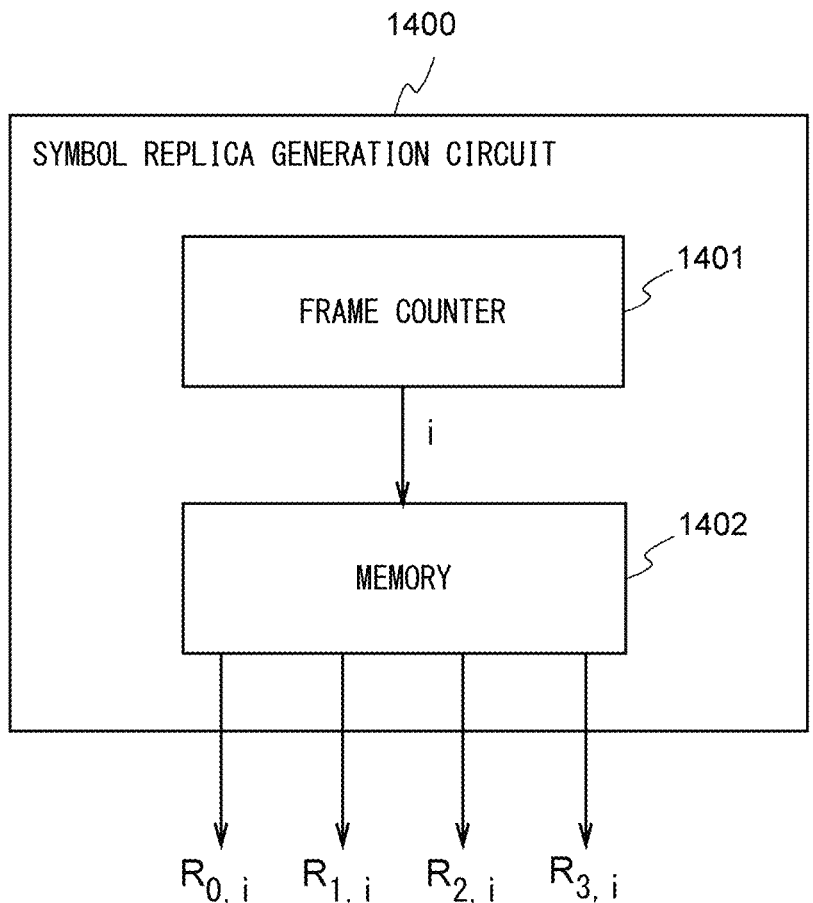
FIG. 14 is a block diagram showing another example of the symbol replica generation circuit.

FIG. 14 shows a symbol replica generation circuit 1400 according to another example embodiment. The symbol replica generation circuit 1400 includes a frame counter 1401 and a memory 1402. The frame counter 1401 generates a value of an address indicating a memory area where the symbol replicas $R_{0,i}$, $R_{1,i}$, $R_{2,i}$, and $R_{3,i}$ are stored. The values the same as those of the symbol replicas $R_{0,i}$, $R_{1,i}$, $R_{2,i}$, and $R_{3,i}$ generated by the symbol replica generation circuit 1300 shown in FIG. 13 are calculated in advance and stored in the memory 1402. These symbol replicas are used by the individual likelihood value calculation circuit 1500 shown in FIG. 15 at a timing when the synchronous signal is input. The individual likelihood value calculation circuit 1500 may read out the symbol replicas stored in the memory 1402 using the value of the address generated by the frame counter 1401. Accordingly, the operation shown in FIG. 13 is not executed each time, whereby it is possible to reduce the amount of the operation in the symbol replica generation circuit 1400.

Figure 15:
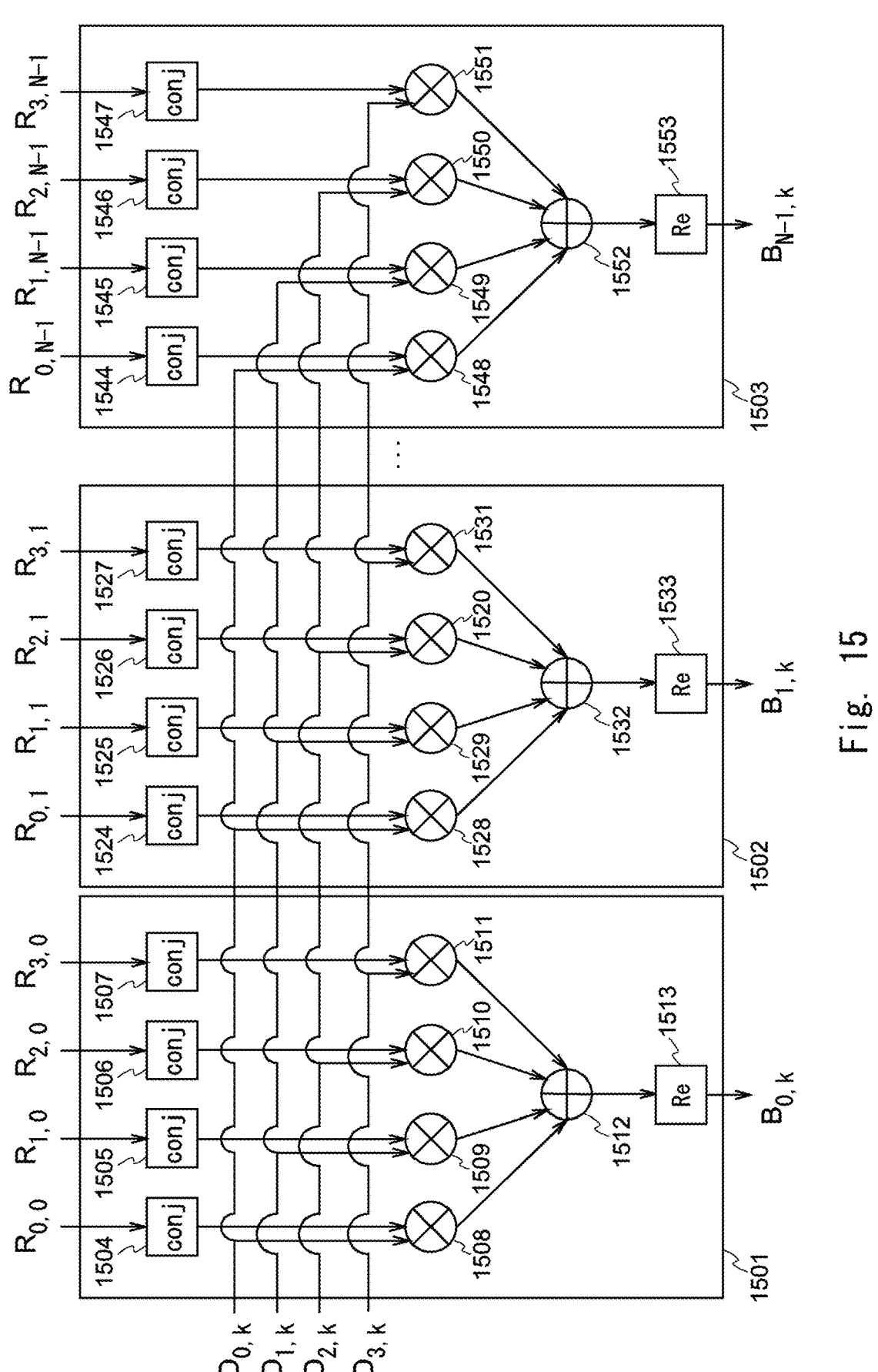
FIG. 15 is a diagram showing one example of a configuration of an individual likelihood value calculation circuit.

FIG. 15 shows individual likelihood value calculation circuits 1501-1503, which are examples of the individual likelihood value calculation circuit 1500. In the following, the configuration and the processing of the individual likelihood value calculation circuit 1501 will be described. The individual likelihood value calculation circuits 1502 and 1503 have configurations similar to that of the individual likelihood value calculation circuit 1501 and perform processing similar to that performed by the individual likelihood value calculation circuit 1501.

The individual likelihood value calculation circuit 1501 includes conjugate complex number conversion circuits (conj) 1504-1507, complex multipliers 1508-1511, a complex adder 1512, and an actual value acquisition circuit 1513 (Re).

First, the conjugate complex number conversion circuits 1504-1507 respectively calculate conjugate complex numbers of the symbol replicas $R_{0,i}$, $R_{1,i}$, $R_{2,i}$, and $R_{3,i}$ of the candidate frame number i. The complex multipliers 1508-1511 respectively multiply the conjugate complex numbers calculated by the conjugate complex number conversion circuits 1504-1507 by the autocorrelation symbols $D_{0,k}$, $D_{1,k}$, $D_{2,k}$, and $D_{3,k}$ generated by the autocorrelation processing circuit 1200 to obtain multiplied values. The complex adder 1512 adds the multiplied values calculated by the respective complex multipliers 1508-1511 to obtain the added value. The actual value acquisition circuit 1513 acquires the real part of the added value calculated by the complex adder 1512. This real part acquired by the actual value acquisition circuit 1513 corresponds to an individual likelihood value $B_{0,k}$.

The individual likelihood value calculation circuits 1501-1503 perform the aforementioned processing on all the candidate frame numbers, thereby calculating the individual likelihood values $B_{0,k}$-$B_{N-1,k}$ of all the candidate frame numbers.

Accordingly, in this example embodiment, one or more conjugate complex number conversion circuits 1504-1507, 1524-1527, and 1544-1547 calculate respective conjugate complex numbers of one or more symbol replicas. Next, the one or more complex multipliers 1508-1511, 1528-1531, and 1548-1551 each multiply the conjugate complex number of the symbol replica calculated by the conjugate complex number conversion circuit by the corresponding autocorrelation symbol generated by the autocorrelation processing circuit 1200 to obtain the multiplied value. Then, the complex adders 1512, 1532, and 1552 each add one or more multiplied values calculated by the above one or more complex multipliers to obtain the added value. Then, the actual value acquisition circuits 1513, 1533, and 1553 each acquire the real part of the added value calculated by the above complex adder, and output the acquired real part as the individual likelihood value of the target frame.

Figure 16:
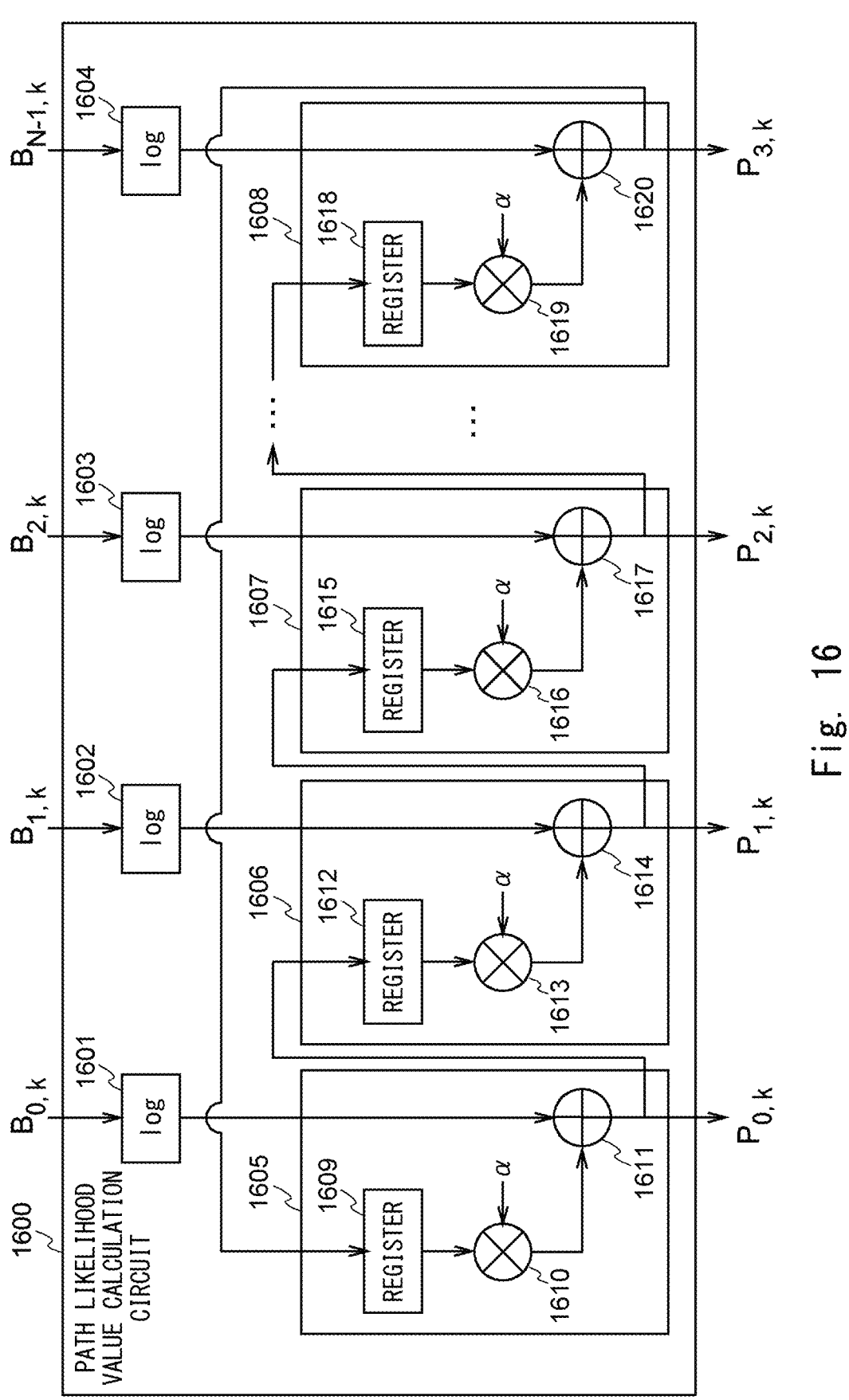
FIG. 16 is a diagram showing one example of a configuration of a path likelihood value calculation circuit.

FIG. 16 shows one example of a configuration of the path likelihood value calculation circuit 1600. The path likelihood value calculation circuit 1600 includes logarithmic operation circuits (log) 1601-1604 and path likelihood value accumulation circuits 1605-1608.

The logarithmic operation circuits 1601-1604 logarithmically transform the individual likelihood value $B_{i,k}$ (i=0 to N−1) of the frame number i calculated by the individual likelihood value calculation circuit 1500.

The path likelihood value accumulation circuit 1605 includes a register 1609, a multiplier 1610, and an adder

1611. The path likelihood value accumulation circuits 1606-1608 have configurations similar to that of the path likelihood value accumulation circuit 1605.

A path likelihood value $P_{N-1,k}$ calculated by the path likelihood value accumulation circuit 1608 is stored in the register 1609.

The multiplier 1610 multiplies the path likelihood value $P_{N-1,k}$ stored in the register 1609 by a constant $\alpha$ to obtain the multiplied value. The constant $\alpha$ is an actual value of a forgetting factor that is larger than 0 but smaller than 1. The constant $\alpha$ is used to gradually reduce the influence of individual likelihood values that have already been calculated. The forgetting factor is a parameter used for moving average or the like. The forgetting factor is used to reduce the influence of a reception error on the following frames by gradually reducing a weight of old data. For example, a path likelihood value Y can be defined using an individual likelihood value X and the constant $\alpha$ as shown in Expression 1.

$$Y = \sum Xi * \alpha^i \qquad \text{[Expression 1]}$$

Note that i is an integer of 0 or larger. $X_0$ denotes the individual likelihood value of the current frame. $X_1$ denotes the individual likelihood value of the frame immediately before the current frame. In other words, the individual likelihood value X with a smaller i indicates that the value is a more recent value. In Expression 1, the individual likelihood value of the current frame has the largest weight, and the individual likelihood values of older frames have smaller weights.

The adder 1611 adds the individual likelihood value $B_{0,k}$ logarithmically transformed by the logarithmic operation circuit 1601 and the multiplied value calculated by the multiplier 1610 to obtain a path likelihood value $P_{0,k}$, and outputs this path likelihood value $P_{0,k}$. The path likelihood value $P_{0,k}$ is stored in a register 1612 of the path likelihood value accumulation circuit 1606 and is used to obtain a path likelihood value regarding the frame next to the frame processed by the path likelihood value accumulation circuit 1605. It can be generally expressed that the path likelihood values $P_{i,k}$ calculated by the path likelihood value accumulation circuits 1605-1608 are each stored in the register included in the path likelihood value accumulation circuit that should process the frame identified by the frame number i+1. Note that the path likelihood value $P_{N-1,k}$ is stored in the register included in the path likelihood value accumulation circuit that should process the frame identified by the frame number i+1, that is, the register 1609.

Figure 17:
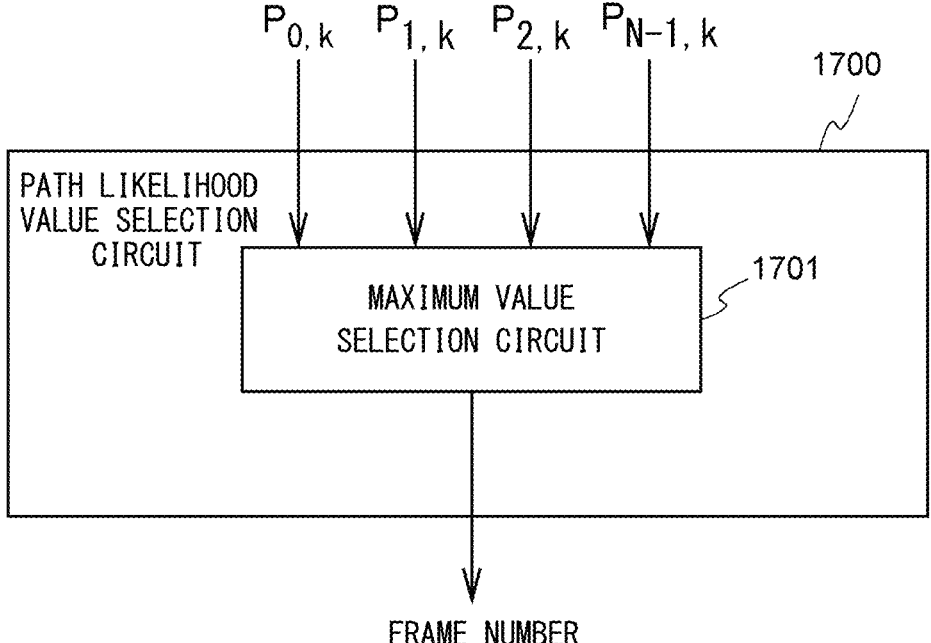
FIG. 17 is a diagram showing one example of a configuration of a path likelihood value selection circuit.

FIG. 17 shows a configuration of the path likelihood value selection circuit 1700 according to one illustrative example embodiment. The path likelihood value selection circuit 1700 includes a maximum value selection circuit 1701. The maximum value selection circuit 1701 selects the largest path likelihood value from among the path likelihood values $P_{i,k}$ calculated by the path likelihood value calculation circuit 1600 and outputs the frame number i that corresponds to the selected path likelihood value as an estimated value of the frame number (hereinafter this value will be referred to as a "frame number estimated value").

In the aforementioned example embodiment, the autocorrelation processing circuit 1200 generates, by using one or more symbol values included in a synchronous signal of a target frame and one or more corresponding symbol values included in a synchronous signal of the frame immediately before the target frame, one or more autocorrelation symbols indicating a change component of frame identification information of the target frame as compared to frame identification information of the frame immediately before the target frame.

On the other hand, the symbol replica generation circuit 1300 generates, by using one or more symbol values that correspond to the frame identification information of the target frame and one or more symbol values that correspond to the frame identification information of the frame immediately before the target frame, one or more symbol replicas indicating a change component of one or more symbol values included in the synchronous signal of the target frame as compared to the one or more symbol values included in the synchronous signal of the frame immediately before the target frame.

The individual likelihood value calculation circuit 1500 calculates, by using the one or more autocorrelation symbols generated by the autocorrelation processing circuit 1200 and the one or more symbol replicas generated by the symbol replica generation circuit 1300, a plurality of individual likelihood values indicating respective likelihoods of the plurality of pieces of frame identification information that are candidates for the frame identification information of the target frame.

Next, the path likelihood value calculation circuit 1600 integrates, for each of the plurality of individual likelihood values calculated by the individual likelihood value calculation circuit 1500, the individual likelihood value of the target frame and the integrated value of individual likelihood values of one or more frames preceding the target frame to obtain a plurality of path likelihood values indicating the respective likelihoods of the plurality of pieces of frame identification information that are candidates for the frame identification information of the target frame. Then, the path likelihood value selection circuit 1700 selects the largest path likelihood value from the path likelihood values calculated by the path likelihood value calculation circuit 1600, and outputs frame identification information that corresponds to the selected path likelihood value.

Accordingly, it is possible to select the most probable frame identification information from among the plurality of pieces of frame identification information that are candidates for the frame identification information of the target frame based on not only the individual likelihood value of the target frame but also the individual likelihood values of one or more frames preceding the target frame. It is therefore possible to obtain highly accurate frame identification information. By performing frame synchronization by using the highly accurate frame identification information in this manner, even in a case where the line quality has been significantly degraded, such as in a poor communication environment during heavy rain or the like, it is possible to obtain the frame synchronization accuracy that is sufficiently high for wireless communication. Further, the aforementioned method for calculating the frame identification information does not affect the transmission rate when the line quality is high.

Further, the path likelihood value calculation circuit 1600 includes logarithmic operation circuits 1601-1604 and adders 1611, 1614, 1617, and 1620. The logarithmic operation circuits 1601-1604 each logarithmically transform the individual likelihood value regarding the frame number of the target frame. The adders 1611, 1614, 1617, and 1620 add the individual likelihood values logarithmically transformed by the logarithmic operation circuits 1601-1604 and the integrated value of the individual likelihood values of one or more preceding frames to obtain the path likelihood values of the target frame. Accordingly, it is possible to implement the multiplication operation of the individual likelihood values by an addition operation and reduce the dynamic range.

Further, the path likelihood value calculation circuit 1600 further includes multipliers 1610, 1613, 1616, and 1619 that multiply the integrated value of the individual likelihood values of one or more preceding frames by the predetermined constant α and output the multiplied values. The adders 1611, 1614, 1617, and 1620 each add the individual likelihood value logarithmically transformed and the multiplied value to obtain the path likelihood value of the target frame. The constant α may be an actual value that is larger than 0 but is smaller than 1. It is therefore possible to reduce the integrated value of the individual likelihood values of one or more preceding frames and thus reduce the influence of individual likelihood values of one or more preceding frames on the path likelihood value of the target frame. In other words, by gradually reducing the weight of old data, the influence of a reception error on the following frames can be reduced.

Figure 18:
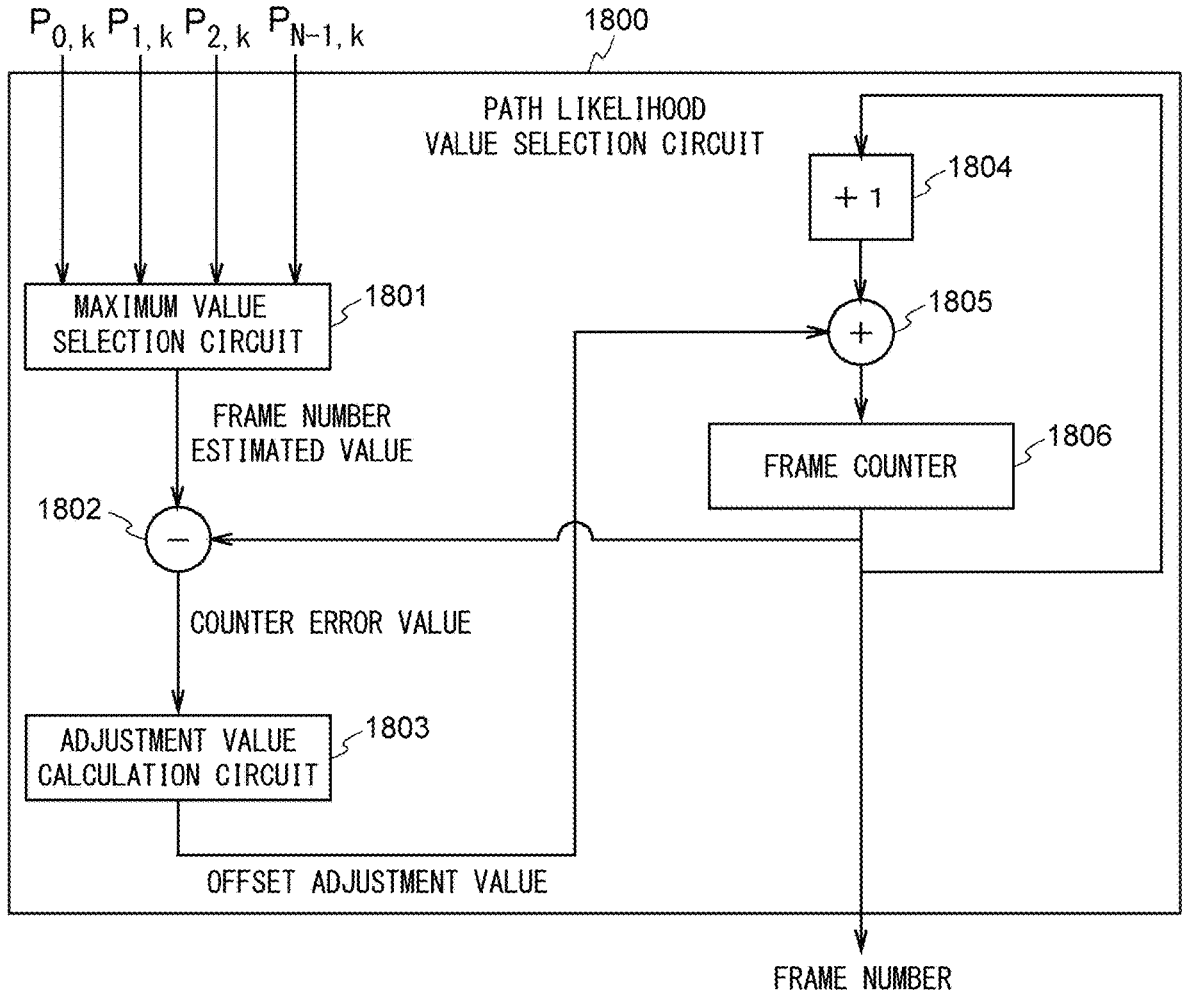
FIG. 18 is a diagram showing one example of a configuration of the path likelihood value selection circuit according to another illustrative example embodiment.

FIG. 18 shows a configuration of a path likelihood value selection circuit 1800 that performs counter synchronization according to another example embodiment. The path likelihood value selection circuit 1800 according to this example embodiment not only selects the frame number that corresponds to the maximum path likelihood value but also determines whether the selected frame number is correct and outputs the frame number that has been determined to be correct. Accordingly, the error rate of the frame number can be reduced.

The path likelihood value selection circuit 1800 includes a maximum value selection circuit 1801, a subtractor 1802, an adjustment value calculation circuit 1803, an increment operation circuit 1804, an adder 1805, and a frame counter 1806.

The maximum value selection circuit 1801 selects the frame number that corresponds to the maximum path likelihood value from among the input path likelihood values $P_{0,k}$, $P_{1,k}$, $P_{2,k}$, and $P_{N-1,k}$ and outputs the selected frame number as a frame number estimated value. The maximum value selection circuit 1801 corresponds to the maximum value selection circuit.

The subtractor 1802 calculates a counter error value using the frame number estimated value output from the maximum value selection circuit 1801 and the value stored in the frame counter 1806 (hereinafter this value will be referred to as a "counter value"). The subtractor 1802 corresponds to the error value calculation circuit. The frame counter 1806 stores an added value obtained by adding a frame number counted up for each frame and an offset adjustment value calculated by the adjustment value calculation circuit 1803 that will be described later. The counter value corresponds to the frame number.

The subtractor 1802 is able to obtain a counter error value by subtracting the current frame number stored in the frame counter 1806 from the frame number estimated value. The subtractor 1802 may also calculate a counter error value by subtracting the frame number estimated value from the current frame number.

The adjustment value calculation circuit 1803 calculates an offset adjustment value for correcting the frame number stored in the frame counter 1806. The details of the configuration of the adjustment value calculation circuit 1803 and processing executed by the adjustment value calculation circuit 1803 will be described later with reference to FIGS. 19 and 20.

The increment operation circuit 1804 adds 1 to the counter value output from the frame counter 1806 and outputs the obtained value. The increment operation circuit 1804 corresponds to the frame number calculation circuit that calculates frame numbers.

The adder 1805 adds the offset adjustment value output from the adjustment value calculation circuit 1803 and the output value of the increment operation circuit 1804. This added value is stored in the frame counter 1806. Therefore, the value calculated based on the frame number of the frame immediately before the target frame is stored in the frame counter 1806. The adder 1805 corresponds to the correction circuit that corrects frame numbers. In another example embodiment, a subtractor may be used in place of the adder 1805 in accordance with the offset adjustment value.

The frame counter 1806 outputs the stored frame number as the output value of the frame synchronization circuit and inputs this frame number to the increment operation circuit 1804. The frame counter 1806 corresponds to the output circuit that outputs the frame number.

Therefore, in the example embodiment shown in FIG. 18, the path likelihood value selection circuit 1800 includes the maximum value selection circuit 1801, the error value calculation circuit 1802, the adjustment value calculation circuit 1803, the frame number calculation circuit 1804, the correction circuit 1805, and the output circuit 1806. The maximum value selection circuit 1801 selects the largest path likelihood value from among the path likelihood values calculated by the path likelihood value calculation circuit. The error value calculation circuit 1802 calculates the error value of the frame number that corresponds to the selected path likelihood value and the counter value that corresponds to the frame number of the frame immediately before the target frame. The frame number calculation circuit 1804 calculates the frame number of the target frame using the counter value. The adjustment value calculation circuit 1803 calculates the adjustment value for correcting the frame number of the target frame using the error value. The correction circuit 1805 corrects the frame number of the target frame using the adjustment value. The output circuit 1806 outputs the corrected frame number of the target frame as the frame number that corresponds to the selected path likelihood value.

Figure 19:
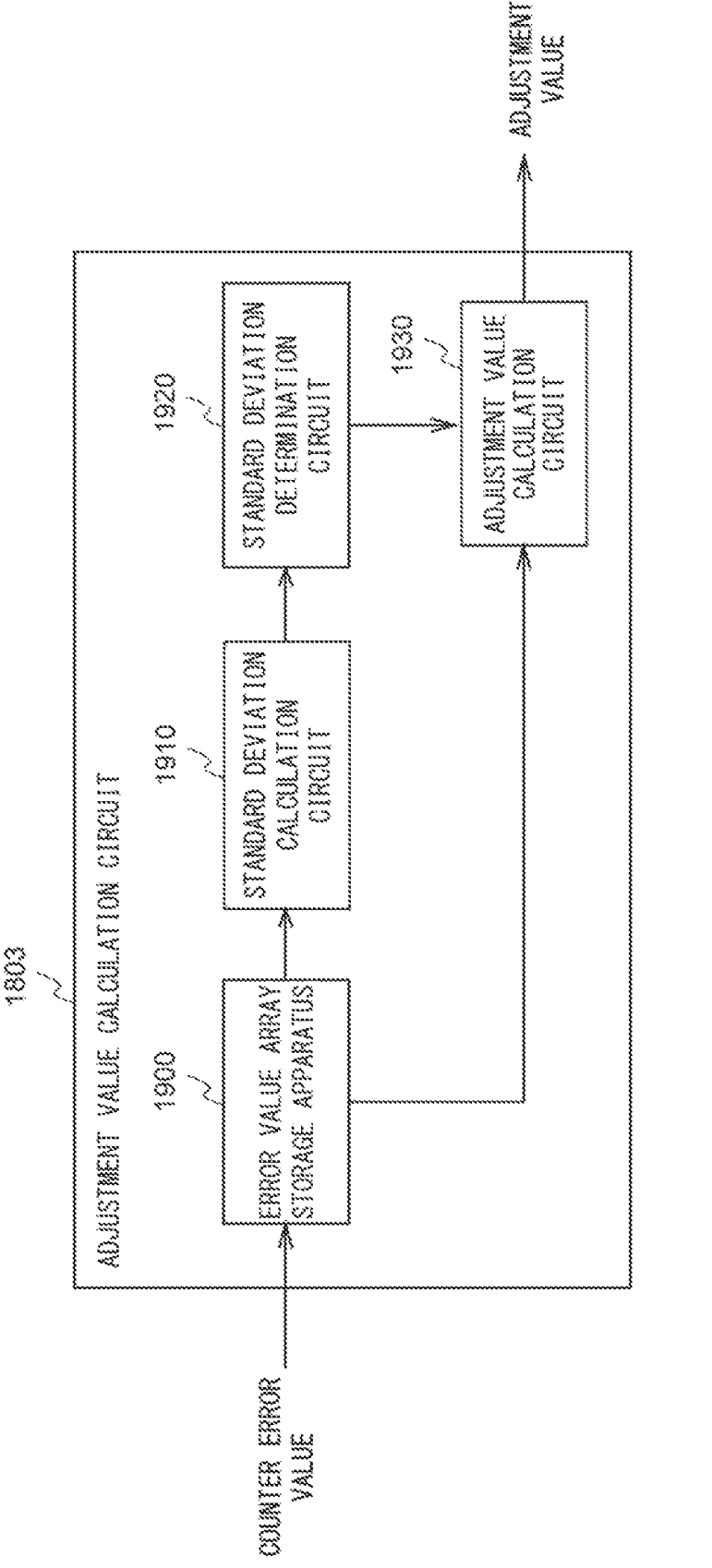
FIG. 19 is a diagram showing one example of a configuration of an adjustment value calculation circuit.

FIG. 19 is a diagram showing one example of a configuration of the adjustment value calculation circuit 1803. The adjustment value calculation circuit 1803 includes an error value array storage apparatus 1900, a standard deviation calculation circuit 1910, a standard deviation determination circuit 1920, and an adjustment value calculation circuit 1930.

The error value array storage apparatus 1900 stores an error value array to which the counter error value output from the subtractor 1802 is input. As the error value array, a counter error value related to the target frame and counter error values related to one or more preceding frames may be stored. In other words, as the error value array, the current counter error value and one or more counter error values calculated in the past may be stored.

The standard deviation calculation circuit 1910 acquires, from the error value array, error values of one or more preceding frames and the error value of the target frame, and calculates the standard deviation of these error values.

The standard deviation determination circuit 1920 determines whether the standard deviation of error values calculated by the standard deviation calculation circuit 1910 is equal to or smaller than a threshold. When the threshold is large, the correct frame number is tracked quickly, but the chance of tracking a wrong value becomes higher. On the other hand, when the threshold is small, the chance of tracking a wrong value becomes lower, but the tracking operation becomes slower, which means that it may take longer time to reach the correct frame number or tracking may not be possible in noisy environments. The threshold is preferably set in view of these elements.

The adjustment value calculation circuit 1930 calculates an adjustment value based on the error value of the target frame and error values of one or more preceding frames. In this example embodiment, the adjustment value may be an integer part of the average value of the error values. In another example embodiment, the adjustment value may be a median value of the error values.

Accordingly, as described above with reference to FIG. 19, the adjustment value calculation circuit 1803 includes the standard deviation calculation circuit 1910, the standard deviation determination circuit 1920, and the adjustment value calculation circuit 1930. The standard deviation calculation circuit 1910 calculates the standard deviation of the error value of the target frame and the error values of one or more preceding frames by using the error values of one or more preceding frames and the error value of the target frame. The standard deviation determination circuit 1920 determines whether the standard deviation of the error values is equal to or smaller than a threshold. When it is determined that the standard deviation of the error values is equal to or smaller than the threshold, the adjustment value calculation circuit 1930 calculates an adjustment value based on the error value of the target frame and error values of one or more preceding frames.

Figure 20:
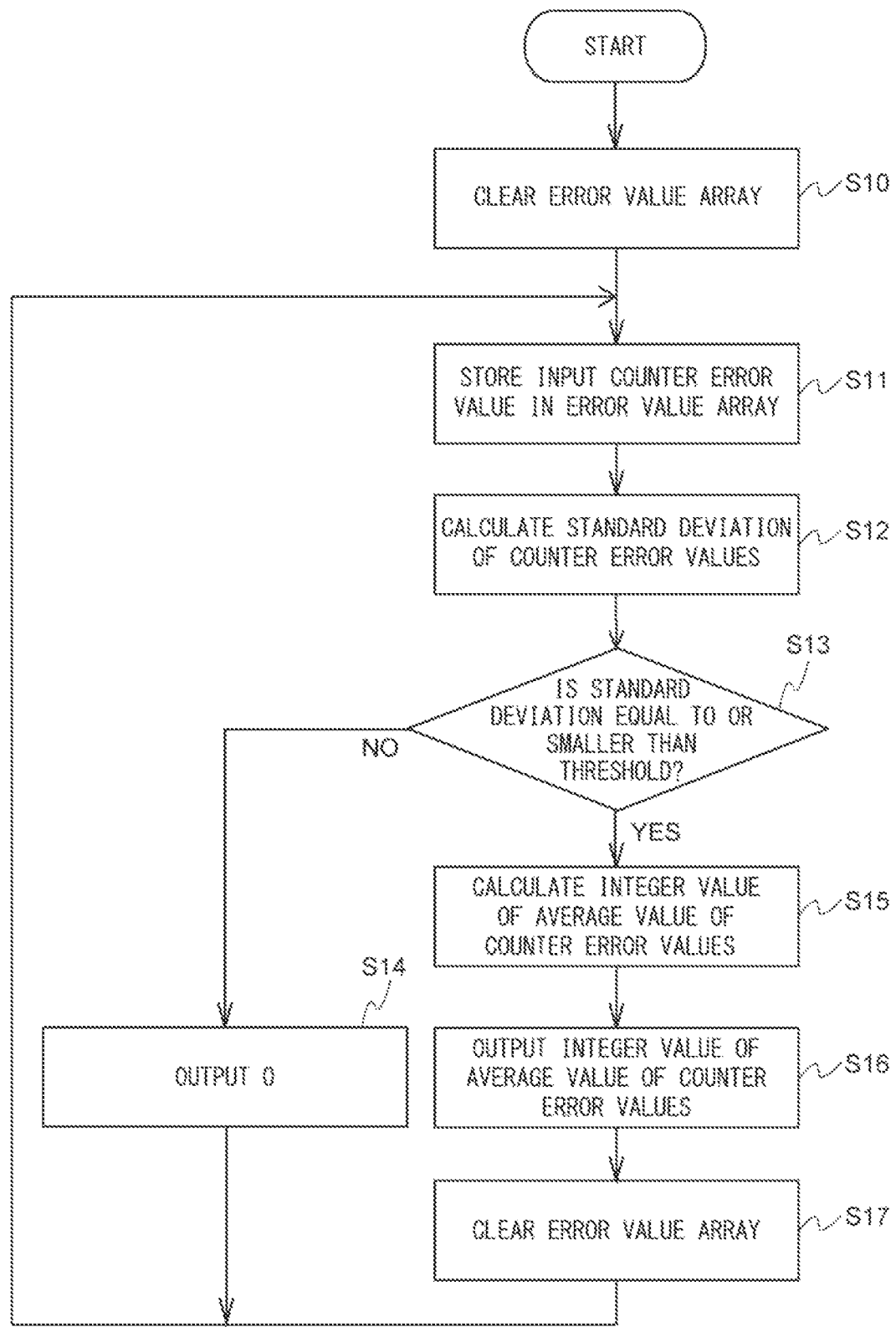
FIG. 20 is a flowchart showing one example of processing executed by the adjustment value calculation circuit.

FIG. 20 is a flowchart showing processing executed by the adjustment value calculation circuit 1803. In Step S10, the error value array stored in the error value array storage apparatus 1900 of the adjustment value calculation circuit 1803 is cleared. In Step S11, the counter error value output from the subtractor 1802 is stored in the error value array of the error value array storage apparatus 1900.

In Step S12, the standard deviation calculation circuit 1910 calculates the standard deviation of the counter error values stored in the error value array. In Step S13, the standard deviation determination circuit 1920 determines whether the standard deviation of the counter error values is equal to or smaller than the threshold. When the standard deviation of the counter error values exceeds the threshold (NO), the adjustment value calculation circuit 1930 outputs "0" as the offset adjustment value in Step S14, and then the process returns to Step S11.

On the other hand, when the standard deviation of the counter error values is equal to or smaller than the threshold (YES), in Step S15, the adjustment value calculation circuit 1930 calculates the average value of the counter error values stored in the error value array and calculates an integer value obtained by rounding off the average value. In Step S16, the adjustment value calculation circuit 1930 outputs the integer value of the average value of the counter error values as the offset adjustment value. In Step S17, the adjustment value calculation circuit 1930 clears the error value array, and the process returns to Step S11.

According to the processing shown in FIG. 20, it is possible to detect that the change in the counter error value has become equal to or smaller than a certain amount and output the integer value of the average value of the counter error values as the offset adjustment value. By correcting the value stored in the frame counter using the offset adjustment value, the error of the output value of the frame number which is due to the error of the frame number estimated value can be reduced.

Figure 21:
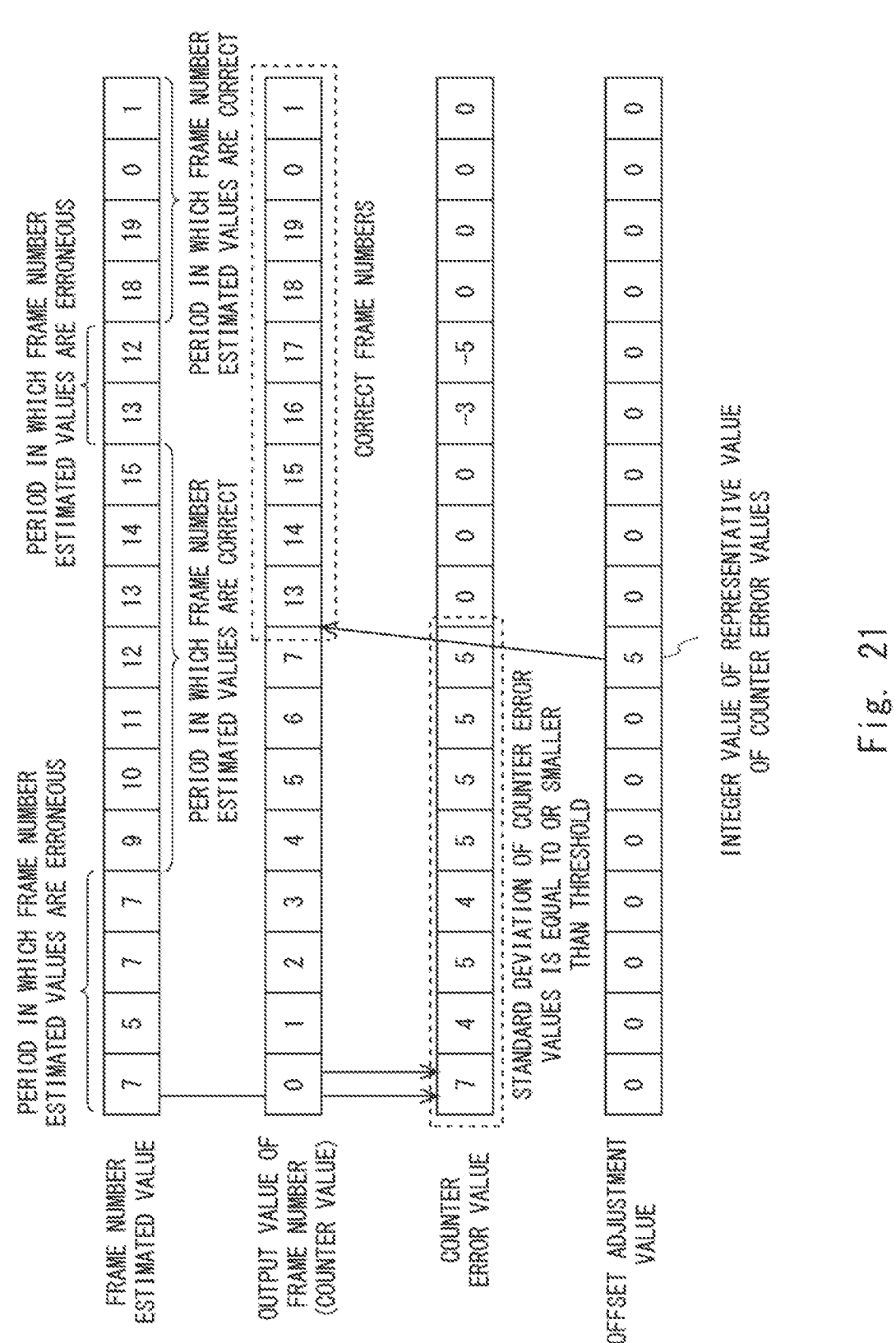
FIG. 21 shows one example of an estimated value of a frame number, a counter value, a counter error value, and an offset adjustment value when the path likelihood value selection circuit shown in FIG. 18 outputs a frame number.

FIG. 21 shows one example of a frame number estimated value, a counter value, a counter error value, and an offset adjustment value when the path likelihood value selection circuit shown in FIG. 18 outputs a frame number. In the example shown in FIG. 21, the counter value of the frame counter 1806 is a value from 0 to 19. Further, in the example shown in FIG. 21, there is a period in which frame number estimated values that correspond to the path likelihood value selected by the maximum value selection circuit 1801 are erroneous.

The subtractor 1802 calculates the counter error value using the frame number estimated value and the counter value shown in FIG. 21. When the standard deviation of the counter error values exceeds the threshold, the adjustment value calculation circuit 1803 outputs "0" as the offset adjustment value. When the standard deviation of the counter error values is equal to or smaller than the threshold, the adjustment value calculation circuit 1803 outputs "5" as the offset adjustment value.

The adder 1805 corrects the counter value using the offset adjustment value calculated by the adjustment value calculation circuit 1803. The adder 1805 calculates, for example, a counter value "13" using the offset adjustment value "5". More specifically, the adder 1805 adds the incremented counter value "8" and the offset adjustment value "5" to obtain the counter value "13".

As described above, the maximum value selection circuit 1801 continuously outputs correct frame number estimated values. When the standard deviation of the counter error values becomes equal to or smaller than the threshold, the counter value of the frame counter 1806 is corrected. Therefore, the path likelihood value selection circuit 1800 is able to output the output value of the correct frame number. Even in a case where the maximum value selection circuit 1801 outputs an erroneous frame number estimated value due to some reason, the path likelihood value selection circuit 1800 is able to continuously output the correct frame numbers as long as the standard deviation of the counter error values exceeds the threshold.

According to the present disclosure, it is possible to provide a signal processing apparatus capable of generating identification information of a highly accurate frame that contributes to improving a frame synchronization accuracy, a signal processing method, and a non-transitory storage medium storing a signal processing program.

In the aforementioned examples, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

The whole or part of the exemplary embodiments disclosed above can be described as, but not limited to, the following supplementary notes.

Supplementary Note 1

A signal processing apparatus comprising:

an autocorrelation processing circuit configured to generate, by using one or more symbol values included in a synchronous signal of a target frame and one or more corresponding symbol values included in a synchronous signal of a frame immediately before the target frame, one or more autocorrelation symbols indicating a change component of frame identification information of the target frame as compared to frame identification information of the frame immediately before the target frame;

a symbol replica generation circuit configured to generate, by using one or more symbol values that correspond to the frame identification information of the target frame and one or more symbol values that correspond to the frame identification information of the frame immediately before the target frame, one or more symbol replicas indicating a change component of one or more symbol values included in the synchronous signal of the frame immediately before the target frame as compared to one or more symbol values included in the synchronous signal of the target frame;

an individual likelihood value calculation circuit configured to calculate, by using the one or more autocorrelation symbols generated by the autocorrelation processing circuit and the one or more symbol replicas generated by the symbol replica generation circuit, a plurality of individual likelihood values indicating respective likelihoods of a plurality of pieces of frame identification information that are candidates for the frame identification information of the target frame;

a path likelihood value calculation circuit configured to integrate, for each of the plurality of individual likelihood values calculated by the individual likelihood value calculation circuit, an individual likelihood value of the target frame and an integrated value of individual likelihood values of one or more frames preceding the target frame to obtain a plurality of path likelihood values indicating respective likelihoods of the plurality of pieces of frame identification information that are candidates for the frame identification information of the target frame; and a path likelihood value selection circuit configured to select the largest path likelihood value from among the path likelihood values obtained by the path likelihood value calculation circuit and output frame identification information that corresponds to the selected path likelihood value.

Supplementary Note 2

The signal processing apparatus according to Supplementary Note 1, wherein the frame identification information is a frame number, and the path likelihood value selection circuit comprises:

a maximum value selection circuit configured to select the largest path likelihood value from among the path likelihood values obtained by the path likelihood value calculation circuit;

an error value calculation circuit configured to calculate an error value of the frame number that corresponds to the selected path likelihood value and a counter value that corresponds to the frame number of the frame immediately before the target frame;

a frame number calculation circuit configured to calculate a frame number of the target frame by using the counter value;

an adjustment value calculation circuit configured to calculate an adjustment value for correcting the frame number of the target frame by using the error value;

a correction circuit configured to correct the frame number of the target frame by using the adjustment value; and an output circuit configured to output the corrected frame number of the target frame as the frame number that corresponds to the selected path likelihood value.

Supplementary Note 3

The signal processing apparatus according to Supplementary Note 2, wherein the adjustment value calculation circuit comprises:

a standard deviation calculation circuit configured to calculate, by using the error values of the one or more preceding frames and the error value of the target frame, a standard deviation of the error value of the target frame and the error values of the one or more preceding frames;

a standard deviation determination circuit configured to determine whether the standard deviation of the error values is equal to or smaller than a threshold; and an adjustment value calculation circuit configured to calculate, when it is determined that the standard deviation of the error values is equal to or smaller than the threshold, the adjustment value by using the error value of the target frame and the error values of the one or more preceding frames.

Supplementary Note 4

The signal processing apparatus according to any one of Supplementary Notes 1 to 3, wherein the frame identification information is a frame number, and the path likelihood value calculation circuit comprises:

a logarithmic operation circuit configured to logarithmically transform an individual likelihood value regarding the frame number of the target frame; and an adder configured to add the individual likelihood value logarithmically transformed by the logarithmic operation circuit and the integrated value of the individual likelihood values of the one or more preceding frames to obtain a path likelihood value of the target frame.

Supplementary Note 5

The signal processing apparatus according to Supplementary Note 4, wherein the path likelihood value calculation circuit further comprises a multiplier configured to multiply the integrated value of the individual likelihood values of the one or more preceding frames by a predetermined value to output the multiplied value, the adder adds the individual likelihood value logarithmically transformed and the multiplied value to obtain the path likelihood value of the target frame, and the predetermined value is an actual value that is larger than 0 but is smaller than 1.

Supplementary Note 6

The signal processing apparatus according to any one of Supplementary Notes 1 to 3, wherein the frame identification information is a frame number, and the individual likelihood value calculation circuit comprises:

one or more conjugate complex number conversion circuits configured to calculate a conjugate complex number of the one or more symbol replicas;

one or more complex multipliers configured to multiply the conjugate complex number of the symbol replica calculated by the conjugate complex number conversion circuit by the corresponding autocorrelation symbol generated by the autocorrelation processing circuit to obtain a multiplied value;

a complex adder configured to add one or more multiplied values calculated by the one or more complex multipliers to obtain an added value; and an actual value acquisition circuit configured to acquire a real part of the added value added by the complex adder to output the acquired real part as an individual likelihood value of the target frame.

Supplementary Note 7

The signal processing apparatus according to any one of Supplementary Notes 1 to 3, wherein the autocorrelation processing circuit comprises:

a plurality of conjugate complex number conversion circuits configured to calculate a plurality of conjugate complex numbers of a plurality of symbol values included in the synchronous signal of the frame immediately before the target frame that corresponds to a plurality of symbol values included in the synchronous signal of the target frame;

a plurality of complex multiplier configured to calculate an inner product of a plurality of symbol values included in the synchronous signal of the target frame and the plurality of conjugate complex numbers calculated by the conjugate complex number conversion circuit to obtain a plurality of complex sequences; and a complex adder configured to add the plurality of complex sequences calculated by the complex multiplier to generate the autocorrelation symbol.

Supplementary Note 8

The signal processing apparatus according to any one of Supplementary Notes 1 to 3, wherein the frame identification information is a frame number, and the symbol replica generation circuit comprises:

a first symbol modulation circuit configured to modulate a frame number of the frame immediately before the target frame to generate one or more modulated symbol values of the frame immediately before the target frame;

a second symbol modulation circuit configured to modulate the frame number of the target frame to generate one or more modulated symbol values of the target frame;

one or more conjugate complex number conversion circuits configured to calculate a conjugate complex number of the modulated symbol value of the frame immediately before the target frame; and one or more complex multipliers configured to multiply the modulated symbol value of the target frame by a conjugate complex number of the modulated symbol value of the frame immediately before the target frame that corresponds to the modulated symbol value of the target frame to generate the symbol replica.

Supplementary Note 9

A signal processing method executed by a computer, wherein the computer is configured to:

generate, by using one or more symbol values included in a synchronous signal of a target frame and one or more corresponding symbol values included in a synchronous signal of a frame immediately before the target frame, one or more autocorrelation symbols indicating a change component of frame identification information of the target frame as compared to frame identification information of the frame immediately before the target frame;

generate, by using one or more symbol values that correspond to the frame identification information of the target frame and one or more symbol values that correspond to the frame identification information of the frame immediately before the target frame, one or more symbol replicas indicating a change component of one or more symbol values included in the synchronous signal of the frame immediately before the target frame as compared to one or more symbol values included in the synchronous signal of the target frame;

calculate, by using the one or more generated autocorrelation symbols and the one or more generated symbol replicas, a plurality of individual likelihood values indicating respective likelihoods of a plurality of pieces of frame identification information that are candidates for the frame identification information of the target frame;

integrate, for each of the plurality of calculated individual likelihood values, an individual likelihood value of the target frame and an integrated value of individual likelihood values of one or more frames preceding the target frame to obtain a plurality of path likelihood values indicating respective likelihoods of the plurality of pieces of frame identification information that are candidates for the frame identification information of the target frame; and select the largest path likelihood value from among the path likelihood values that have been calculated and output frame identification information that corresponds to the selected path likelihood value.

Supplementary Note 10

The signal processing method according to Supplementary Note 9, wherein the frame identification information is a frame number, and the computer is configured to:

select the largest path likelihood value from among the path likelihood values that have been calculated;

calculate an error value of the frame number that corresponds to the selected path likelihood value and a counter value that corresponds to the frame number of the frame immediately before the target frame;

calculate a frame number of the target frame by using the counter value;

calculate an adjustment value for correcting the frame number of the target frame by using the error value;

correct the frame number of the target frame by using the adjustment value; and output the corrected frame number of the target frame as the frame number that corresponds to the selected path likelihood value.

Supplementary Note 11

The signal processing method according to Supplementary Note 10, wherein the computer is configured to:

calculate a standard deviation of the error value of the target frame and the error values of the one or more preceding frames by using the error values of the one or more preceding frames and the error value of the target frame;

determine whether the standard deviation of the error values is equal to or smaller than a threshold; and calculate, when it is determined that the standard deviation of the error values is equal to or smaller than the threshold, the adjustment value by using the error value of the target frame and the error values of the one or more preceding frames.

Supplementary Note 12

The signal processing method according to any one of Supplementary Notes 9 to 11, wherein the frame identification information is a frame number, and the computer is configured to:

logarithmically transform an individual likelihood value regarding the frame number of the target frame; and add the individual likelihood value logarithmically transformed and the integrated value of the individual likelihood values of the one or more preceding frames to obtain a path likelihood value of the target frame.

Supplementary Note 13

The signal processing method according to Supplementary Note 12, wherein the computer is configured to:

multiply the integrated value of the individual likelihood values of the one or more preceding frames by a predetermined value to output the multiplied value;

add the individual likelihood value logarithmically transformed and the multiplied value to obtain the path likelihood value of the target frame; and the predetermined value is an actual value that is larger than 0 but is smaller than 1.

Supplementary Note 14

The signal processing method according to any one of Supplementary Notes 9 to 11, wherein the frame identification information is a frame number, and the computer is configured to:

calculate a conjugate complex number of the one or more symbol replicas;

multiply the calculated conjugate complex number of the symbol replica by the generated corresponding autocorrelation symbol to obtain a multiplied value;

add one or more calculated multiplied values to obtain an added value; and acquire a real part of the calculated added value to output the acquired value as an individual likelihood value of the target frame.

Supplementary Note 15

The signal processing method according to any one of Supplementary Notes 9 to 11, wherein the computer is configured to:

calculate a plurality of conjugate complex numbers of a symbol value included in the synchronous signal of the frame immediately before the target frame that corresponds to a plurality of symbol values included in the synchronous signal of the target frame;

calculate an inner product of a plurality of symbol values included in the synchronous signal of the target frame and the plurality of calculated conjugate complex numbers to obtain a plurality of complex sequences; and add the plurality of calculated complex sequences to generate the autocorrelation symbol.

Supplementary Note 16

The signal processing method according to any one of Supplementary Notes 9 to 11, wherein the frame identification information is a frame number, and the computer is configured to:

modulate a frame number of the frame immediately before the target frame to generate one or more modulated symbol values of the frame immediately before the target frame;

modulate a frame number of the target frame to generate one or more modulated symbol values of the target frame;

calculate a conjugate complex number of the modulated symbol value of the frame immediately before the target frame; and multiply the modulated symbol value of the target frame by a conjugate complex number of the modulated symbol value of the frame immediately before the target frame that corresponds to the modulated symbol value of the target frame to generate the symbol replica.

Supplementary Note 17

A signal processing program executed by a computer, the signal processing program causing the computer to:

generate, by using one or more symbol values included in a synchronous signal of a target frame and one or more corresponding symbol values included in a synchronous signal of a frame immediately before the target frame, one or more autocorrelation symbols indicating a change component of frame identification information of the target frame as compared to frame identification information of the frame immediately before the target frame;

generate, by using one or more symbol values that correspond to the frame identification information of the target frame and one or more symbol values that correspond to the frame identification information of the frame immediately before the target frame, one or more symbol replicas indicating a change component of one or more symbol values included in the synchronous signal of the frame immediately before the target frame as compared to one or more symbol values included in the synchronous signal of the target frame;

calculate, by using the one or more generated autocorrelation symbols and the one or more generated symbol replicas, a plurality of individual likelihood values indicating respective likelihoods of a plurality of pieces of frame identification information that are candidates for the frame identification information of the target frame;

integrate, for each of the plurality of calculated individual likelihood values, an individual likelihood value of the target frame and an integrated value of individual likelihood values of one or more frames preceding the target frame to cause the computer to obtain a plurality of path likelihood values indicating respective likelihoods of the plurality of pieces of frame identification information that are candidates for the frame identification information of the target frame; and select the largest path likelihood value from among the path likelihood values that have been calculated to cause the computer to output frame identification information that corresponds to the selected path likelihood value.

Supplementary Note 18

The signal processing program according to Supplementary Note 17, wherein the frame identification information is a frame number, and the signal processing program causes the computer to:
select the largest path likelihood value from among the path likelihood values that have been calculated;

calculate an error value of the frame number that corresponds to the selected path likelihood value and a counter value that corresponds to the frame number of the frame immediately before the target frame;

calculate a frame number of the target frame by using the counter value;

calculate an adjustment value for correcting the frame number of the target frame by using the error value;

correct the frame number of the target frame by using the adjustment value; and output the corrected frame number of the target frame as the frame number that corresponds to the selected path likelihood value.

Supplementary Note 19

The signal processing program according to Supplementary Note 18, the signal processing program causing the computer to:

calculate a standard deviation of the error value of the target frame and the error values of the one or more preceding frames by using the error values of the one or more preceding frames and the error value of the target frame;

determine whether the standard deviation of the error values is equal to or smaller than a threshold; and calculate, when it is determined that the standard deviation of the error values is equal to or smaller than the threshold, the adjustment value by using the error value of the target frame and the error values of the one or more preceding frames.

Supplementary Note 20

The signal processing program according to any one of Supplementary Notes 17 to 19, wherein the frame identification information is a frame number, and the signal processing program causes the computer to:
logarithmically transform an individual likelihood value regarding the frame number of the target frame; and add the individual likelihood value logarithmically transformed and the integrated value of the individual likelihood values of the one or more preceding frames to obtain a path likelihood value of the target frame.

What is claimed is:

1. A signal processing apparatus comprising:

an autocorrelation processing circuit configured to generate, by using one or more symbol values included in a synchronous signal of a target frame and one or more corresponding symbol values included in a synchronous signal of a frame immediately before the target frame, one or more autocorrelation symbols indicating a change component of frame identification information of the target frame as compared to frame identification information of the frame immediately before the target frame;

a symbol replica generation circuit configured to generate, by using one or more symbol values that correspond to the frame identification information of the target frame and one or more symbol values that correspond to the frame identification information of the frame immediately before the target frame, one or more symbol replicas indicating a change component of the one or more symbol values included in the synchronous signal of the frame immediately before the target frame as compared to the one or more symbol values included in the synchronous signal of the target frame;

an individual likelihood value calculation circuit configured to calculate, by using the one or more autocorrelation symbols generated by the autocorrelation processing circuit and the one or more symbol replicas generated by the symbol replica generation circuit, a plurality of individual likelihood values indicating respective likelihoods of a plurality of pieces of frame identification information that are candidates for the frame identification information of the target frame;

a path likelihood value calculation circuit configured to integrate, for each of the plurality of individual likelihood values calculated by the individual likelihood value calculation circuit, an individual likelihood value of the target frame and an integrated value of individual likelihood values of one or more frames preceding the target frame to obtain a plurality of path likelihood values indicating respective likelihoods of the plurality of pieces of frame identification information that are candidates for the frame identification information of the target frame; and a path likelihood value selection circuit configured to select the largest path likelihood value from among the path likelihood values obtained by the path likelihood value calculation circuit and output frame identification information that corresponds to the selected path likelihood value.

2. The signal processing apparatus according to claim 1, wherein the frame identification information is a frame number, and the path likelihood value selection circuit comprises:

a maximum value selection circuit configured to select the largest path likelihood value from among the path likelihood values obtained by the path likelihood value calculation circuit;

an error value calculation circuit configured to calculate an error value of the frame number that corresponds to the selected path likelihood value and a counter value that corresponds to the frame number of the frame immediately before the target frame;

a frame number calculation circuit configured to calculate a frame number of the target frame by using the counter value;

an adjustment value calculation circuit configured to calculate an adjustment value for correcting the frame number of the target frame by using the error value;

a correction circuit configured to correct the frame number of the target frame by using the adjustment value; and an output circuit configured to output the corrected frame number of the target frame as the frame number that corresponds to the selected path likelihood value.

3. The signal processing apparatus according to claim 2, wherein the adjustment value calculation circuit comprises:

a standard deviation calculation circuit configured to calculate, by using the error values of the one or more preceding frames and the error value of the target frame, a standard deviation of the error value of the target frame and the error values of the one or more preceding frames;

a standard deviation determination circuit configured to determine whether the standard deviation of the error values is equal to or smaller than a threshold; and an adjustment value calculation sub-circuit configured to calculate, when it is determined that the standard deviation of the error values is equal to or smaller than the threshold, the adjustment value by using the error value of the target frame and the error values of the one or more preceding frames.

4. The signal processing apparatus according to claim 1, wherein the frame identification information is a frame number, and the path likelihood value calculation circuit comprises:

a logarithmic operation circuit configured to logarithmically transform an individual likelihood value regarding the frame number of the target frame; and an adder configured to add the individual likelihood value logarithmically transformed by the logarithmic operation circuit and the integrated value of the individual likelihood values of the one or more preceding frames to obtain a path likelihood value of the target frame.

5. The signal processing apparatus according to claim 1, wherein the frame identification information is a frame number, the path likelihood value calculation circuit comprises:

a logarithmic operation circuit configured to logarithmically transform an individual likelihood value regarding the frame number of the target frame;

a multiplier configured to multiply the integrated value of the individual likelihood values of the one or more preceding frames by a predetermined value to output the multiplied value, and an adder configured to add the individual likelihood value logarithmically transformed by the logarithmic operation circuit and the multiplied value to obtain the path likelihood value of the target frame, and the predetermined value is an actual value that is larger than 0 but is smaller than 1.

6. The signal processing apparatus according to claim 1, wherein the frame identification information is a frame number, and the individual likelihood value calculation circuit comprises:

one or more conjugate complex number conversion circuits configured to calculate a conjugate complex number of the one or more symbol replicas;

one or more complex multipliers configured to multiply the conjugate complex number of the symbol replica calculated by the conjugate complex number conversion circuit by the corresponding autocorrelation symbol generated by the autocorrelation processing circuit to obtain a multiplied value;

a complex adder configured to add one or more multiplied values calculated by the one or more complex multipliers to obtain an added value; and an actual value acquisition circuit configured to acquire a real part of the added value added by the complex adder to output the acquired real part as an individual likelihood value of the target frame.

7. The signal processing apparatus according to claim 1, wherein the autocorrelation processing circuit comprises:

a plurality of conjugate complex number conversion circuits configured to calculate a plurality of conjugate complex numbers of the one or more symbol values included in the synchronous signal of the frame immediately before the target frame that corresponds to the one or more symbol values included in the synchronous signal of the target frame;

a plurality of complex multiplier configured to calculate an inner product of the one or more symbol values included in the synchronous signal of the target frame and the plurality of conjugate complex numbers calculated by the conjugate complex number conversion circuit to obtain a plurality of complex sequences; and a complex adder configured to add the plurality of complex sequences calculated by the complex multiplier to generate the one or more autocorrelation symbols.

8. The signal processing apparatus according to claim 1, wherein the frame identification information is a frame number, and the symbol replica generation circuit comprises:

a first symbol modulation circuit configured to modulate a frame number of the frame immediately before the target frame to generate one or more modulated symbol values of the frame immediately before the target frame;

a second symbol modulation circuit configured to modulate the frame number of the target frame to generate one or more modulated symbol values of the target frame;

one or more conjugate complex number conversion circuits configured to calculate a conjugate complex number of the modulated symbol value of the frame immediately before the target frame; and one or more complex multipliers configured to multiply the modulated symbol value of the target frame by a conjugate complex number of the modulated symbol value of the frame immediately before the target frame that corresponds to the modulated symbol value of the target frame to generate the one or more symbol replicas.

9. A signal processing method executed by a computer, wherein the method comprises:

generating, by using one or more symbol values included in a synchronous signal of a target frame and one or more corresponding symbol values included in a synchronous signal of a frame immediately before the target frame, one or more autocorrelation symbols indicating a change component of frame identification information of the target frame as compared to frame identification information of the frame immediately before the target frame;

generating, by using one or more symbol values that correspond to the frame identification information of the target frame and one or more symbol values that correspond to the frame identification information of the frame immediately before the target frame, one or more symbol replicas indicating a change component of the one or more symbol values included in the synchronous signal of the frame immediately before the target frame as compared to the one or more symbol values included in the synchronous signal of the target frame;

calculating, by using the one or more generated autocorrelation symbols and the one or more generated symbol replicas, a plurality of individual likelihood values indicating respective likelihoods of a plurality of pieces of frame identification information that are candidates for the frame identification information of the target frame;

integrating, for each of the plurality of calculated individual likelihood values, an individual likelihood value of the target frame and an integrated value of individual likelihood values of one or more frames preceding the target frame to obtain a plurality of path likelihood values indicating respective likelihoods of the plurality of pieces of frame identification information that are candidates for the frame identification information of the target frame;

selecting the largest path likelihood value from among the path likelihood values that have been calculated; and outputting frame identification information that corresponds to the selected path likelihood value.

10. The signal processing method according to claim 9, wherein the frame identification information is a frame number, the selecting comprises:

calculating an error value of the frame number that corresponds to the selected path likelihood value and a counter value that corresponds to the frame number of the frame immediately before the target frame;

calculating a frame number of the target frame by using the counter value;

calculating an adjustment value for correcting the frame number of the target frame by using the error value; and correcting the frame number of the target frame by using the adjustment value, and the outputting comprises:

outputting the corrected frame number of the target frame as the frame number that corresponds to the selected path likelihood value.

11. The signal processing method according to claim 10, wherein the calculating the adjustment value comprises:

calculating a standard deviation of the error value of the target frame and the error values of the one or more preceding frames by using the error values of the one or more preceding frames and the error value of the target frame;

determining whether the standard deviation of the error values is equal to or smaller than a threshold; and calculating, when it is determined that the standard deviation of the error values is equal to or smaller than the threshold, the adjustment value by using the error value of the target frame and the error values of the one or more preceding frames.

12. The signal processing method according to claim 9, wherein the frame identification information is a frame number, and the integrating comprises:

logarithmically transforming an individual likelihood value regarding the frame number of the target frame; and adding the individual likelihood value logarithmically transformed and the integrated value of the individual likelihood values of the one or more preceding frames to obtain a path likelihood value of the target frame.

13. The signal processing method according to claim 9, wherein the frame identification information is a frame number, the integrating comprises:

logarithmically transforming an individual likelihood value regarding the frame number of the target frame;

multiplying the integrated value of the individual likelihood values of the one or more preceding frames by a predetermined value to output the multiplied value; and adding the individual likelihood value logarithmically transformed and the multiplied value to obtain the path likelihood value of the target frame, and the predetermined value is an actual value that is larger than 0 but is smaller than 1.

14. The signal processing method according to claim 9, wherein the frame identification information is a frame number, and the calculating comprises:

calculating a conjugate complex number of the one or more symbol replicas;

multiplying the calculated conjugate complex number of the symbol replica by the generated corresponding autocorrelation symbol to obtain a multiplied value;

adding one or more calculated multiplied values to obtain an added value; and acquiring a real part of the calculated added value to output the acquired value as an individual likelihood value of the target frame.

15. The signal processing method according to claim 9, wherein the generating the one or more autocorrelation symbols comprises:

calculating a plurality of conjugate complex numbers of a symbol value included in the synchronous signal of the frame immediately before the target frame that corresponds to the one or more symbol values included in the synchronous signal of the target frame;

calculating an inner product of the one or more symbol values included in the synchronous signal of the target frame and the plurality of calculated conjugate complex numbers to obtain a plurality of complex sequences; and adding the plurality of calculated complex sequences to generate the one or more autocorrelation symbols.

16. The signal processing method according to claim 9, wherein the frame identification information is a frame number, and the generating the one or more symbol replicas comprises:

modulating a frame number of the frame immediately before the target frame to generate one or more modulated symbol values of the frame immediately before the target frame;

modulating a frame number of the target frame to generate one or more modulated symbol values of the target frame;

calculating a conjugate complex number of the modulated symbol value of the frame immediately before the target frame; and multiplying the modulated symbol value of the target frame by a conjugate complex number of the modulated symbol value of the frame immediately before the target frame that corresponds to the modulated symbol value of the target frame to generate the one or more symbol replicas.

17. A non-transitory computer readable medium storing a signal processing program, the signal processing program causing a computer to execute:

generating, by using one or more symbol values included in a synchronous signal of a target frame and one or more corresponding symbol values included in a synchronous signal of a frame immediately before the target frame, one or more autocorrelation symbols indicating a change component of frame identification information of the target frame as compared to frame identification information of the frame immediately before the target frame;

generating, by using one or more symbol values that correspond to the frame identification information of the target frame and one or more symbol values that correspond to the frame identification information of the frame immediately before the target frame, one or more symbol replicas indicating a change component of the one or more symbol values included in the synchronous signal of the frame immediately before the target frame as compared to the one or more symbol values included in the synchronous signal of the target frame;

calculating, by using the one or more generated autocorrelation symbols and the one or more generated symbol replicas, a plurality of individual likelihood values indicating respective likelihoods of a plurality of pieces of frame identification information that are candidates for the frame identification information of the target frame;

integrating, for each of the plurality of calculated individual likelihood values, an individual likelihood value of the target frame and an integrated value of individual likelihood values of one or more frames preceding the target frame to obtain a plurality of path likelihood values indicating respective likelihoods of the plurality of pieces of frame identification information that are candidates for the frame identification information of the target frame;

selecting the largest path likelihood value from among the path likelihood values that have been calculated; and outputting frame identification information that corresponds to the selected path likelihood value.

18. The non-transitory computer readable medium according to claim 17, wherein the frame identification information is a frame number, the selecting comprises:

calculating an error value of the frame number that corresponds to the selected path likelihood value and a counter value that corresponds to the frame number of the frame immediately before the target frame;

calculating a frame number of the target frame by using the counter value;

calculating an adjustment value for correcting the frame number of the target frame by using the error value; and correcting the frame number of the target frame by using the adjustment value, and the outputting comprises:

outputting the corrected frame number of the target frame as the frame number that corresponds to the selected path likelihood value.

19. The non-transitory computer readable medium according to claim 18, wherein the calculating the adjustment value comprises:

calculating a standard deviation of the error value of the target frame and the error values of the one or more preceding frames by using the error values of the one or more preceding frames and the error value of the target frame;

determining whether the standard deviation of the error values is equal to or smaller than a threshold; and calculating, when it is determined that the standard deviation of the error values is equal to or smaller than the threshold, the adjustment value by using the error value of the target frame and the error values of the one or more preceding frames.

20. The non-transitory computer readable medium according to claim 17, wherein the frame identification information is a frame number, and the integrating comprises:

logarithmically transforming an individual likelihood value regarding the frame number of the target frame; and adding the individual likelihood value logarithmically transformed and the integrated value of the individual likelihood values of the one or more preceding frames to obtain a path likelihood value of the target frame.

* * * * *